(12) United States Patent
Chomik et al.

(10) Patent No.: US 9,102,467 B2
(45) Date of Patent: Aug. 11, 2015

(54) WASTE STORAGE DEVICE

(75) Inventors: Richard S. Chomik, Orlando, FL (US); Mark Yoho, Chagrin Falls, OH (US); Stuart Leslie, Larchmont, NY (US); Taek Kim, Washington Township, NJ (US); Aidan Petrie, Jamestown, RI (US); Joe Sejnowski, North Kingstown, RI (US)

(73) Assignee: Eveready Battery Company, Inc., St. Louis, MO (US)

( * ) Notice: Subject to any disclaimer, the term of this patent is extended or adjusted under 35 U.S.C. 154(b) by 795 days.

(21) Appl. No.: 11/390,941

(22) Filed: Mar. 27, 2006

(65) Prior Publication Data

US 2006/0237461 A1 Oct. 26, 2006
US 2012/0152958 A9 Jun. 21, 2012

Related U.S. Application Data

(62) Division of application No. 10/714,381, filed on Nov. 6, 2003, now abandoned.

(60) Provisional application No. 60/499,443, filed on Sep. 2, 2003.

(51) Int. Cl.
*B65D 25/14* (2006.01)
*B65D 35/14* (2006.01)
(Continued)

(52) U.S. Cl.
CPC . *B65F 1/062* (2013.01); *B65B 7/12* (2013.01); *B65B 9/15* (2013.01); *B65B 67/1277* (2013.01);
(Continued)

(58) Field of Classification Search
CPC .... A47K 11/026; B65B 9/15; B65B 67/1277; B65F 2240/132; B65F 2210/162; B65F 2210/167; B65F 2210/1675; Y10S 220/9083

USPC .......... 220/495.06, 495.07; 53/370, 526, 567, 53/576; 250/231.17
See application file for complete search history.

(56) References Cited

U.S. PATENT DOCUMENTS 1,265,148 A 4/1917 Warren
1,226,634 A 5/1917 Briese
(Continued)

FOREIGN PATENT DOCUMENTS

CA 2048630 9/1990
CA 2019173 12/1990
(Continued)

OTHER PUBLICATIONS

Office Action from U.S. Appl. No. 11/707,714 dated Dec. 31, 2008.
(Continued)

*Primary Examiner* — Fenn Mathew
*Assistant Examiner* — Andrew T Kirsch
(74) *Attorney, Agent, or Firm* — Energizer Personal Care, LLC.

(57) ABSTRACT

A sealing mechanism for a waste storage container includes a waste storage container that has a body, a lid and a cartridge adapted to be positioned in the body. The cartridge has a continuous length of storage film therein. The storage film emanates through a gap between a rim and a core tube of the cartridge and is folded down through a core opening in the core tube into an interior space of the body of the waste storage container. The sealing mechanism includes an actuator accessible from outside of the body, a gear assembly operably connected to the actuator, a retaining assembly that holds stationary a dispensed portion of the storage film in the interior space of the body during a twist-closure operation, and a plunger operably connected to the gear assembly.

45 Claims, 24 Drawing Sheets

(51) Int. Cl.
*B65D 90/00* (2006.01)
*B65B 7/12* (2006.01)
*B65B 51/00* (2006.01)
*B65B 9/10* (2006.01)
*B65B 43/42* (2006.01)
*G01D 5/34* (2006.01)
*G01J 9/00* (2006.01)
*B65F 1/06* (2006.01)
*B65B 9/15* (2006.01)
*B65B 67/12* (2006.01)
*B65F 1/14* (2006.01)
*B29C 65/38* (2006.01)
*B29C 65/00* (2006.01)
*B29L 31/00* (2006.01)

(52) U.S. Cl.
CPC .......... *B65F 1/1405* (2013.01); *B65F 1/1426* (2013.01); *B65F 1/163* (2013.01); *B65F 1/1607* (2013.01); *B29C 65/38* (2013.01); *B29C 66/1122* (2013.01); *B29C 66/43* (2013.01); *B29L 2031/7128* (2013.01); *B65B 2067/1283* (2013.01); *B65F 2210/124* (2013.01); *B65F 2210/167* (2013.01); *B65F 2210/1675* (2013.01); *B65F 2240/132* (2013.01)

(56) References Cited

U.S. PATENT DOCUMENTS

| | | | |
|---|---|---|---|
| 1,239,427 | A | 9/1917 | Bunnel et al. |
| 2,352,503 | A | 6/1944 | Walton |
| 2,411,430 | A | 9/1945 | Hodson |
| 3,077,457 | A | 2/1963 | Kulka |
| 3,321,103 | A | 5/1967 | Phillips |
| 3,452,368 | A | 7/1969 | Couper |
| 3,516,846 | A | 6/1970 | Matson |
| 3,516,941 | A | 6/1970 | Matson |
| 3,536,192 | A | 10/1970 | Couper |
| 3,579,416 | A | 5/1971 | Schrenk |
| 3,602,924 | A | 9/1971 | Kneisley |
| 3,619,822 | A | 11/1971 | Carmiche |
| 3,655,129 | A | 4/1972 | Seiner |
| 3,665,522 | A | 5/1972 | Backlund et al. |
| 3,741,253 | A | 6/1973 | Brax et al. |
| 3,762,454 | A | 10/1973 | Wilkins, Jr. |
| 3,778,383 | A | 12/1973 | Chibler et al. |
| 3,835,692 | A | 9/1974 | Hoffman |
| 3,923,005 | A | 12/1975 | Fry et al. |
| 3,935,692 | A | 2/1976 | Miller |
| 4,009,253 | A | 2/1977 | Schleppnik |
| 4,025,969 | A | 5/1977 | Dahlen |
| 4,087,376 | A | 5/1978 | Foris et al. |
| 4,089,802 | A | 5/1978 | Foris et al. |
| 4,100,103 | A | 7/1978 | Foris et al. |
| 4,101,711 | A | 7/1978 | Stillman |
| 4,146,128 | A | 3/1979 | Hogg et al. |
| 4,187,251 | A | 2/1980 | Schleppnik |
| 4,251,386 | A | 2/1981 | Saeki et al. |
| 4,254,169 | A | 3/1981 | Schroeder |
| 4,254,179 | A | 3/1981 | Carson, III et al. |
| 4,275,651 | A * | 6/1981 | Groth et al. ............... 100/229 A |
| 4,284,444 | A | 8/1981 | Bernstein et al. |
| 4,310,512 | A | 1/1982 | Schleppnik |
| 4,351,876 | A | 9/1982 | Doi et al. |
| 4,427,110 | A | 1/1984 | Shaw, Jr. |
| 4,456,124 | A | 6/1984 | Kay et al. |
| 4,519,104 | A | 5/1985 | Nilsson |
| 4,593,516 | A | 6/1986 | Alameda et al. |
| 4,612,221 | A | 9/1986 | Biel et al. |
| 4,622,221 | A | 11/1986 | Schleppnik |
| 4,660,758 | A | 4/1987 | Tavel et al. |
| 4,702,385 | A | 10/1987 | Shillington et al. |
| 4,705,707 | A | 11/1987 | Winter |
| 4,716,061 | A | 12/1987 | Winter |
| 4,865,371 | A | 9/1989 | Egberg |
| 4,869,049 | A * | 9/1989 | Richards et al. ............... 53/459 |
| 4,893,722 | A | 1/1990 | Jones |
| 4,898,633 | A | 2/1990 | Doree et al. |
| 4,909,986 | A | 3/1990 | Kobayashi et al. |
| 4,934,529 | A | 6/1990 | Richards et al. |
| 4,959,207 | A | 9/1990 | Ueda et al. |
| 4,974,746 | A | 12/1990 | Dickinson |
| 4,987,299 | A * | 1/1991 | Kobayashi et al. ...... 250/231.14 |
| 5,022,553 | A | 6/1991 | Pontius |
| 5,025,719 | A * | 6/1991 | Thomas ..................... 100/99 |
| 5,027,578 | A | 7/1991 | Natterer et al. |
| 5,031,793 | A | 7/1991 | Chen et al. |
| 5,039,243 | A | 8/1991 | O'Brien |
| 5,056,293 | A | 10/1991 | Richards et al. |
| 5,087,420 | A | 2/1992 | Jackson |
| 5,125,526 | A | 6/1992 | Sumanis |
| 5,129,735 | A | 7/1992 | Neal et al. |
| 5,147,055 | A | 9/1992 | Samson et al. |
| 5,158,199 | A | 10/1992 | Pontius |
| 5,174,462 | A | 12/1992 | Hames |
| 5,238,301 | A | 8/1993 | Brady |
| 5,294,017 | A | 3/1994 | Li |
| 5,295,607 | A | 3/1994 | Chang |
| 5,303,841 | A | 4/1994 | Mezey |
| 5,318,230 | A | 6/1994 | Ferguson et al. |
| 5,337,581 | A | 8/1994 | Lott |
| 5,385,259 | A | 1/1995 | Bernstein et al. |
| 5,464,189 | A | 11/1995 | Li |
| 5,505,328 | A | 4/1996 | Stribiak |
| 5,520,303 | A | 5/1996 | Bernstein et al. |
| 5,534,105 | A | 7/1996 | Boyd |
| 5,534,165 | A | 7/1996 | Pilosof et al. |
| 5,535,913 | A | 7/1996 | Asbach et al. |
| 5,590,512 | A | 1/1997 | Richards et al. |
| 5,640,931 | A | 6/1997 | Markham |
| 5,655,680 | A | 8/1997 | Asbach et al. |
| 5,659,933 | A | 8/1997 | McWilliams |
| 5,718,887 | A | 2/1998 | Wolf et al. |
| 5,799,909 | A | 9/1998 | Ziegler |
| 5,813,200 | A | 9/1998 | Jacoby et al. |
| 5,860,959 | A | 1/1999 | Gent |
| 5,938,305 | A | 8/1999 | Rubsam-Tomlinson |
| 6,047,843 | A | 4/2000 | Mecke |
| 6,065,272 | A | 5/2000 | Lecomte |
| 6,128,890 | A * | 10/2000 | Firth ..................... 53/567 |
| 6,129,715 | A | 10/2000 | Cunningham |
| 6,129,716 | A | 10/2000 | Steer |
| 6,141,945 | A | 11/2000 | Becher |
| 6,150,004 | A | 11/2000 | Oikawa et al. |
| 6,170,240 | B1 | 1/2001 | Jacoby et al. |
| 6,202,877 | B1 | 3/2001 | LaTorre et al. |
| 6,258,423 | B1 | 7/2001 | Giori |
| 6,370,847 | B1 | 4/2002 | Jensen et al. |
| 6,516,588 | B2 | 2/2003 | Jensen et al. |
| 6,612,099 | B2 | 9/2003 | Stravitz |
| 6,719,194 | B2 | 4/2004 | Richards |
| 6,719,914 | B2 | 4/2004 | Nakatani et al. |
| 6,804,930 | B2 | 10/2004 | Stravitz |
| 6,851,251 | B2 | 2/2005 | Stravitz |
| 6,925,781 | B1 | 8/2005 | Knuth et al. |
| 7,350,663 | B2 | 4/2008 | Chomik et al. |
| 7,395,646 | B2 | 7/2008 | Salman et al. |
| 7,743,588 | B2 | 6/2010 | Webb |
| 2002/0066261 | A1 | 6/2002 | Richards |
| 2002/0162304 | A1 | 11/2002 | Stravitz |
| 2003/0208995 | A1 | 11/2003 | Stravitz |
| 2003/0230579 | A1 | 12/2003 | Chomik et al. |
| 2004/0020175 | A1 | 2/2004 | Stravitz |
| 2004/0083681 | A1 | 5/2004 | Stravitz |
| 2005/0016890 | A1 | 1/2005 | Tannock |
| 2005/0044819 | A1 | 3/2005 | Chomik et al. |
| 2005/0103499 | A1 | 5/2005 | Chomik et al. |

FOREIGN PATENT DOCUMENTS

| | | |
|---|---|---|
| CA | 1298191 | 3/1992 |
| CA | 1318234 | 5/1993 |
| CA | 2218628 | 4/1998 |

(56) References Cited

FOREIGN PATENT DOCUMENTS

| | | |
|---|---|---|
| CA | 2443680 | 10/2002 |
| CA | 2486136 | 5/2005 |
| EP | 0281355 | 9/1988 |
| EP | 0404470 | 12/1990 |
| FR | EP0005660 | 11/1979 |
| GB | 550857 | 1/1943 |
| GB | 1156725 | 7/1969 |
| GB | 2041319 | 9/1980 |
| GB | 2048206 | 12/1980 |
| JP | 592039015 | 11/1979 |
| WO | PCT/GB97/02768 | 4/1998 |
| WO | WO 98/17536 | 4/1998 |
| WO | WO 02/051788 | 7/2002 |
| WO | WO 02/083525 | 10/2002 |
| WO | 02/087795 | 11/2002 |

OTHER PUBLICATIONS

Office Action from U.S. Appl. No. 11/707,714 dated Nov. 29, 2007.
Office Action from U.S. Appl. No. 10/931,337 dated Dec. 31, 2008.
Office Action from U.S. Appl. No. 10/931,337 dated Jan. 29, 2008.
Office Action from U.S. Appl. No. 10/931,337 dated Oct. 17, 2007.
Office Action from U.S. Appl. No. 10/931,337 dated May 3, 2007.
Office Action from U.S. Appl. No. 10/931,337 dated Sep. 6, 2006.
Office Action from U.S. Appl. No. 10/931,337 dated Mar. 22, 2006.
Office Action from U.S. Appl. No. 10/714,381 dated Jan. 26, 2006.
Office Action from U.S. Appl. No. 10/714,381 dated Jun. 7, 2005.
Office Action from U.S. Appl. No. 10/714,381 dated Jan. 19, 2005.
Office Action from U.S. Appl. No. 10/477,041 dated Apr. 30, 2007.
Office Action from U.S. Appl. No. 10/477,041 dated Jul. 27, 2006.
Office Action from U.S. Appl. No. 10/477,041 dated Apr. 14, 2006.
Office Action from U.S. Appl. No. 10/477,041 dated Jan. 30, 2006.
Office Action from U.S. Appl. No. 10/477,041 dated Jun. 6, 2005.
Office Action from Canadian Application No. 2,486,136 dated Feb. 5, 2008.
Office Action from Canadian Application No. 2,443,680 dated May 5, 2008.
Office Action from Mexican Application No. 2003/009237 dated May 29, 2007.
Office Action from Mexican Application No. 2003/009237 dated Jan. 2, 2007.
Office Action from Mexican Application No. 2003/009237 dated Oct. 4, 2006.
International Search Report from PCT Application No. PCT/US02/11021 dated Sep. 12, 2002.
International Preliminary Examination Report from PCT Application No. PCT/US02/11021 dated Aug. 22, 2003.
International Search Report and Written Opinion Based on PCT/US2005/31361 Dated Feb. 22, 2006.
International Search Report and Written Opinion Based on PCT/US2005/31445 Dated Apr. 6, 2006.
British Examination Report Based on Application No. GB0706156.7 Dated Aug. 15, 2007.

\* cited by examiner

WASTE STORAGE DEVICE

CROSS-REFERENCE TO RELATED APPLICATIONS

This is a divisional application of U.S. patent application Ser. No. 10/714,381, filed on Nov. 6, 2003, which claims the benefit of U.S. Provisional patent application Ser. No. 60/499,443, filed on 2 Sep. 2003. Each of the above-noted applications is incorporated herein by reference.

BACKGROUND OF THE INVENTION

1. Field of the Invention

The present invention relates to a waste storage device or container. More particularly, the present invention relates to a waste storage device having an automated mechanism for twisting a tubular sealing material about waste, deposited in such tubular sealing material.

2. Description of the Related Art

Waste receptacles are generally fitted with a lid designed to contain odors when the lid is closed. However, most lids are not designed to be perfectly air-tight in respect of their receptacles, or after repeated use become less-than air tight, permitting malodor to emanate from the receptacles even when they are closed. Even with the most air-tight containers, upon opening the container, noxious odors escape into the ambient environment giving an extremely unpleasant sensation to the person attempting to add more trash to the receptacle. Location of the receptacles in a remote location is inconvenient and generally unsatisfactory.

A particularly difficult trash to retain for ultimate disposal is odoriferous trash. The cumulative odor of odoriferous trash being stored within the container frequently reaches such an offensive level that the trash must be disposed of before the container is full. The latter problem typically results in excessive emptying operations. In the case of odoriferous soiled diapers, for example, excessive emptying operations can be of particular concern as one hesitates to leave an infant unattended or to carry an infant and the soiled diapers to a remote location. A further problem associated with such containers is that the containers themselves over time tend to retain the malodor even when no diapers are present in the containers. Therefore, a thorough and complete cleaning of such containers is often necessary to reduce the lingering odor. Furthermore, as most disposal receptacles are not child-proof, toddlers playing around such containers may inadvertently open a container to allow odors to escape, or the child may reach in to touch the undesirable trash.

There are a number of waste disposal systems for disposing of odiferous waste materials such as soiled diapers. The systems are often touted as a convenient way to dispose of such waste materials and reduce or eliminate any odor that may emanate from the materials. An example of such systems is U.S. Pat. No. 5,147,055 which discloses a container that includes an activated charcoal filter to retain and absorb odors within the container.

Other trash receptacles employ one of several approaches to reduce the emanation of malodor from the receptacle, including the use of masking agents, odor sorbent material, inner lids or seals, air locks or sealed packaging. Scented trash receptacles have been commercially available for many years. Scent is added to the diaper pail in the hope of hiding the smell of the malodor by producing a smell that masks the malodor to the olfactory senses. The problem with such receptacles is that the masking smell itself can often become irritating to the consumer, as well as the fact that most scented diaper pails loose their masking effect after a period of time.

European patent application No. 0005660, the contents of which are incorporated by reference herein, describes a device for disposing kitchen refuse in packages enclosed by flexible tubing derived from a tubular pack of tubing surrounding a tubular guide. The device includes a sealing mechanism for sealing along the tubular material. The tubing passes from the pack over the top of and then down a guide to a position beneath the guide where it is closed by fusion to provide a receptacle. When this receptacle is full of refuse, a lever is manually operated to actuate an electro-mechanical apparatus including clamping and fusion devices that travel round closed tracks to perform the four-fold task of drawing the receptacle down below the tubular guide, fusing the tubing walls together to seal the top of the receptacle, sealing the tubing walls together to provide the closed base of the next receptacle and dividing the tubing by heat at a location between these two fusion locations to separate the filled package. There are a number of disadvantages with this device including the need for latches to prevent the wheels extending from the heating elements from inadvertently returning up the central track portions (as opposed to following the outer track portions as they should. A further disadvantage is that the heating element must be at least the width of the tube in order to seal the tube all the way across thereby preventing, for example, the escape of odors from the waste.

A popular approach for disposing of diapers has been a device using, for example, a tube twisting mechanism to form a pouch about a diaper. As an example, see the disclosures of U.S. Pat. Nos. 4,869,049, 5,590,512, and 5,813,200, the contents of all of which are incorporated by reference herein. The '049 patent discloses an apparatus to form packages containing disposable diapers comprising a tubing which passes through the top edges of a core and then down through the core. The core is turned by means of a lid about a cylinder to twist the flexible material. Similarly, the '512 patent discloses an apparatus for disposing objects in packages formed by pushing the objects in series into a funnel-shaped portion of flexible tubing drawn from pack over the rim of the funnel. The patent also discloses that each package is closed at the top by twisting the tubing by turning the funnel fixed to the pack about its axis. As disclosed in the '049 and '512 patents, the process of sealing the tubing to form the packages is performed manually and requires the use of both hands.

U.S. Pat. No. 5,813,200 to Jacoby, et al. discloses a device for disposing of soiled diapers in twisted packages. The device has a container body with a hinged base, a hinged lid, and an upward cylinder secured within the container body. A tubular core rests on a portion of the upward cylinder to allow rotation there between. A flexible tube or sleeve rests on a portion of the tubular core with the tubing being circumferentially pleated as stored. Springs are fixed to the container and project radially inward to engage a package formed from the tube. The springs are equally spaced around the interior of the container to hold the package during the forming of a twist in the tube.

The device disclosed in U.S. Pat. No. 5,813,200 is used to form a series of packages enclosing objects. The top of the flexible tubing is pulled upwards and tied into a knot. The closed end formed by the knot can then form the bottom of a package with the sidewalls formed by the tubing. The object is inserted and rests against the tubing near the knot. A rotatable interior lid is put into place and rotated such that the unused tubing and the tubular core rotate with respect to the package that is being formed. The package being formed does not rotate because it is held in place by friction between it and springs. Thus a package is formed between the knot and a first twist. Subsequently, objects are disposed and twisted in a like manner to form discrete packages with twists between them.

Devices such as that disclosed in U.S. Pat. No. 5,813,200 are a convenient way of disposing of soiled diapers. A disadvantage of the system is that the twists between packages may become unraveled, thereby allowing groups of diapers to collect within the tubing, which makes emptying the container more difficult. Further, the twists may not create a continuous, complete seal and, therefore, may allow odor to escape from a package. Increasing the twists between packages may eliminate the above disadvantages, however, this requires the use of additional tubing.

Another example of a device used to decrease odors that emanate from diaper waste is disclosed in U.S. Pat. Nos. 6,370,847 and 6,516,588, both issued to Jensen, et al. These related patents disclose a sealable diaper-disposal system that includes a container body, a tubular core on which flexible tubing is stored, and a tube-sealing mechanism having a pair of heating elements. The flexible tubing is pulled from the tubular core and passed between the pair of heating elements. The tube-sealing mechanism operates to move the pair of heating elements toward each other to fuse the width of the tubing, and away from each other to allow the tubing to be pushed into the lower portion of the container body.

Commercial waste storage devices for disposal of baby diapers, are known. One such device is the Playtex Diaper Genie®. In the Diaper Genie®, a film cartridge having a hole concentrically located therein, is positioned in a waste container body. The film cartridge has a top surface from which a storage film extends and has a twist ring secured in the concentric hole of the cartridge. The storage film extends from the film cartridge, over and then down through the twist ring, down through the hole in the film cartridge and into the waste container body. The user manually opens the lid assembly by hand and places waste such as a diaper through the twist ring and hole in the film cartridge, into the storage film. The twist ring is then manually rotated by the user's hand, which causes the film cartridge and storage film to rotate, tying off and sealing the disposed waste in the storage film. The storage film is continuously fed from the film cartridge. The commercial Diaper Genie® device requires the user to rotate the twist ring by hand to seal the storage film about the waste to form a waste product.

The contents of all of the prior art references cited herein are incorporated by reference. From the above it can be understood by those having ordinary skill in the art that there are a number of disadvantages associated with prior art waste disposal devices using flexible tubing and tubular sealing material to form packets for disposal of waste materials. It is clear that a device is needed that will eliminate the disadvantages described above. Such a device should be relatively economical to purchase, and consistently make the seals between packets complete so that they cannot become undone, and it is easy to operate.

SUMMARY OF THE INVENTION

The present invention is directed to a waste storage or waste disposal device or container employing tubular sealing material/flexible tubing, wherein the sealing operation of the tube about a waste load is performed mechanically, electrically and electro-mechanically. More particularly, embodiments of the present invention is provide a waste storage device that has an automated operated sealing mechanism.

The present invention provides automated mechanisms for sealing waste in a tubular storage material, in particular a film. The automated sealing mechanism, preferably seals by activation of a mechanical, electrical, or electro-mechanical actuator which causes a twisting of the tubular material in which waste is placed so as to form a sealed waste package. Such twisting of the tubular storage material may be caused, for example, by rotating the cassette in respect of a retention mechanism for the tubing, rotating the retention mechanism with respect to the cassette, rotating the tubular storage material with respect to the cartridge and/or retention mechanism. In a preferred embodiment, one part is mobile while the other parts in the system remain static or substantially static.

In one embodiment, the sealing mechanism allows, a first actuation of an actuator to open the lid and a second actuation of an actuator to seal the tubular storage material.

In yet another embodiment, the sealing mechanism comprises a rack gear operably connected to an actuator, a clutch, and a spring connected to the rack gear. Actuation of the actuator causes the rack gear to move in a first direction against the bias of the spring and release of the actuator causes the rack gear to move in a second direction under the bias of the spring, which causes the clutch to rotate the cartridge. A locking mechanism optionally is operably connected to the spring with a first actuation of the actuator locking the spring in a compressed position while a second actuation of the actuator unlocks the spring.

In one embodiment of the present invention there is disclosed a waste container for sanitary disposal of waste including a container body defining a waste bin and an opening that provides access to the waste bin; a support mounted to the container body adjacent the opening, the support having a flange extending therefrom that is configured for mounting a tubing cassette above the waste bin, wherein the support encloses less than all of the opening to the waste compartment so that waste can be passed through the opening and into the waste chamber; a tubing cassette mounted to the flange of the support; and a tube twisting/sealing means for forming individual waste packets from tubing that is dispensed from the tubing cassette.

According to another embodiment of the invention there is provided a waste container with an automated twisting feature, a tubing cassette rotationally mounted to a flange support; and a retention means for preventing rotation of a waste packet contained in a portion of the tubing when the tubing cassette is rotated, such that a twist is efficiently created in the tubing. The flange may be configured to allow rotation of the tubing cassette. The cassette may be rotated by electrical power as for example by a motorized rotating grip to create a closure twisting action of the flexible tubing when sequestering a waste packet. A motorized apparatus of this embodiment of the invention may optionally provide a plunging device for downwardly pushing the flexible tubing a predetermined distance, thereby providing sufficient space for depositing a waste packet.

Another embodiment of the present invention comprises an upper or head compartment located on top of the waste container encompassing an apparatus comprising a drive plate mounted to the tubing cassette, a drive gear assembly engaged with the drive plate, and a motor mounted to the upper compartment apparatus and having an output shaft that rotates the drive gear when the motor is activated, the power from the motor being transmitted through at least one gear or a series of gears. A timing circuit may be employed for activating the motor to rotate the tubing cassette one of a predetermined amount of time or a predetermined number of times. A sensing detection device, as for example by electro-optical means, counting physical disruptions, for example, marks on the rotating component may also be employed. A manually operated switch may be used for activating the motor.

The upper or head portion of the waste container may also serve as lid over the lower receptacle compartment or waste bin of the waste container. The lid or upper compartment of the waste container of the invention may be hingedly attached to the container body for enclosing the opening to the waste bin. The lid or head portion of the container may be secured with a latch device. In addition, the hinge itself may include a latching mechanism or a biasing means to retain the lid in an open position when desired. A foot pedal assembly may be attached to the lid for opening the lid. Such assemblies are well known to those of ordinary skill in the art.

Another embodiment of the present invention is a waste container including a container body defining a waste bin and an opening that provides access to the waste bin; a support mounted to the container body adjacent the opening, the support having a flange extending therefrom that is configured for rotational mounting of a tubing cassette above the waste bin, wherein the support encloses less than all of the opening to the waste bin so that waste packs can be passed through the opening and into the waste bin.

In one embodiment of the invention there is provided a downward thrust plunging portion attached by a scissor slat assembly to a screw-type gear drive which is powered by an electrical motor through a gear transmission assembly; the activated thrust plate may be extended downwardly to push onto a twist-locked flexible tubing sequestering a waste pack; the waste pack thereby being urged into the container waste bin compartment.

Embodiments of the invention may be equipped with a thrust plate to effect a downward thrusting motion at the twist-tightened upper end of the flexible tubing enclosing the waste pack pulling additional tubing from the refill cassette so as to provide a pouch-like space below the cassette core opening in order to receive the is next waste pack to seal waste in the pouch-like space. A twist-tightening motion may then be effectuated to seal waste in the pouch-like space.

In another embodiment there is an automatically controlled apparatus for individually sequestering packs of odorous waste in a length of flexible tubing which is dispensed and depending from a core tube portion inside a tubular refill cassette. Such apparatus may combine a lower compartment or bin for receiving and storing the tubing enclosed waste packs; and an upper compartment for accommodating and securing the electronically powered and controlled system for sequestering each pack of waste in the flexible tubing (of course such control systems may be found in other areas of the container or outside of the container). Preferably, the waste packet sequestering part of the tubing may be held by a retention or clamping device. The sequestering event may be initiated by an electrical actuator causing a rotational movement of the tubing refill cassette or dispenser, the tube itself, or the tubular retention mechanism/device, so as to effect a twist tightening of the flexible tubing which depends downward from the tubing cassette into the lower compartment of the waste receptacle. The activator may activate downward motion of a thrusting plate to urge the twist-locked waste packet into the waste receiving bin and simultaneously provide another length of flexible tubing for the next deposit of a waste packet.

Embodiments may further provide a means for cutting the twist-tightened upper portion of the flexible tubing individually enclosing and sequestering a series of waste packs. Such cutting means preferably are suitably located at a position above the twisted portion of the tubing and below the refill cassette enabling removal of the tubing sequestered waste pack from receptacle bins.

The rotational twist-tightening of the flexible tubing so as to lock can be reinforced by an adhesive containing device, ribbon, marks, etc., e.g., microbeads that encapsulate adhesives, segmentally positioned on the inside surface of the tubing material, said adhesive being activated by the twisting of the flexible tubing. Alternatively, the flexible tubing material can comprise clinging properties for reinforced twist stabilization and sealing effect. The adhesive location can be placed on the inside of the flexible tubing at predetermined intervals or segments suitable for sequestering the waste packets.

Embodiments may optionally comprise a film grip ring for gripping or holding the flexible tubing in place in order to prevent the inadvertent release of the stored tubing from the rotating cassette during the twisting operation. This advantageous aspect assists in creating a measurably effective tight twist lock of the sequestered waste packet in the tubing segment.

Embodiments may optionally comprise a trigger mechanism for actuating the thrust mechanism determining the start of the downward motion of the thrusting plate at the end or completion of rotational motion the core tube, effecting the twist closure of the flexible tubing above the sequestered waste packet. The trigger mechanism may be initiated by a timing device or optical counter which actuates the thrust mechanism after a preset interval of rotational movement, of for example, the cassette or retention mechanism The optical counter can be aided, for example, by a laser-optical detection device.

The present invention provides an automatic device for the convenient and hygienic sequestering of waste packets. Waste packets may comprise any material, for example, nursing home and hospital waste products, diapers, smelly food, etc.

For the purpose of this invention, any device that closes off flexible tubing at a point along the length of the tubing is considered a "tube-sealing means." Therefore, for example, fusion devices, which close off tubing with heating elements, and twisting devices, which close off tubing by inducing a twist, are considered "tube-sealing means." Several tube-sealing means are disclosed herein above in the background of the invention. Other exemplary tube-sealing means are disclosed in U.S. Pat. Nos. 6,128,890 and 6,065,272, the contents of all of which are incorporated by reference herein.

In one embodiment of the invention, the waste storage device comprises an automatically controlled mechanism for sequestering the waste packets individually inside a flexible tubing bay of some length dispensed from a refill cassette. The hands-off embodiment features a motor-driven rotation of the refill cassette inner core tube portion thereby twisting the tubing the waste packet which may be held in place by, for example, spring-aided holder/brackets. Moreover, the embodiment may comprise a driveshaft connected to the motor through a gear assembly or transmission. The driveshaft may be activated when the tubing twisting rotation is completed and the waste packet is closed off or sequestered in the tubing material. The driveshaft may be connected by a pinion through the connecting scissor slats to the thrust plate of the plunger. The rotation of the driveshaft, i.e. a rod with a screw-type outer ridge, may wind through the nut-like center hole of the pinion, which is thereby slideably moved along holding or locating means or rod causing the scissor connectors to extend and vertically move the thrust plate plunging or pressing down onto the twist-closure of the tubing portion sequestering the waste packet, which is consequently placed down deeper in the waste bin of the container.

In another embodiment, there is a motorized two-step mechanism controlling the twisting and plunging of the automated waste sequestering operation. Such mechanism may be manually turned on by, for example, pushing a button, e.g., on top of the lid or head portion of the container. A depressed button may contact electrically the actuator of the apparatus motor, causing an initial twisting rotation of the cassette core tube. Other actuation mechanisms such as a foot operated switch or lever may be used. The rotation of the motor driveshaft, for example, may be transmitted through at least one gear or a set of gears to a rotatory ring that engages the cassette rim by was of small ridges projecting therefrom a top on the cassette, the bottom of the cassette, side of the cassette, or other portion of the casette when the upper head or lid compartment of the waste receptacle is closed. The second step of the automated control of the waste sequestering mechanism of this embodiment may cause a plunging/thrusting device or plate to downwardly thrust and extend onto the twist-locked waste packet. Thus, the flexible tubing is pulled from the storage compartment of the cassette through a gap between the inner core tube and the rim atop the refill cassette.

In one embodiment, the lid is opened by foot operated or activated mechanism which acts upon the lid at the latch mechanism which causes the lid to be in the open position. A waste load is deposited into the open center of the cassette. Upon release of foot-operated mechanism, the lid is caused to close so that the motorized actuator mechanism acts by a cog gearing system causing it to rotate a cassette holding a tubing bag receptacle. The rotation accomplishes two activities for sequestering a diaper or similar waste load and dropping or moving the same downwardly into the tubing bag. At the closed lid position, the actuator initiates the rotation placing a force on the tubing cassette by a cassette twister exerting pressure on the beveled ring surface of the cassette. The rotational movement is measured to continue until sufficiently tight twisting has been effected on the tubing bag so as to close the top opening and thereby retain the waste load. At the moment when the twisting or tightening by cassette rotation is complete for sufficient closure of the tubing tubular bag, a vertically dispensed gearing mechanism, for example, may be turned on and cause a downward movement of the thrust plate. This downward thrust may be mediated through a scissor link assembly which stretches out to extend along the axis of the cassette opening, moving the sequestered waste load downward. Simultaneous to the motorized rotational force applied on the cassette rim, a film grip ring may be activated to contact and clamp down on to the flexible tubing emanating and hanging over the top edge of the inner core tube of the tubing cassette. This contact prevents release of tubing from the storage compartment of the cassette during the rotational twisting operation.

In another embodiment, there is disclosed a waste disposal device comprising a cassette housing flexible tubing and an automated twist mechanism wherein the twist mechanism is operationally structured to twist and untwist a portion of dispensed flexible tubing so as to open and close the tube for further disposal of waste product upon opening and closing of the lid. Such automated twist/untwist function may also have application to waste disposal devices comprising conventional garbage bags or similar bags.

In yet another embodiment, the waste disposal device comprises a container defining a waste chamber for receiving encapsulated waste packages; a lid coupled to the container and movable between an open position in which the chamber is accessible and a closed position in which the chamber is covered; a cartridge arranged in the container and containing a length of flexible tubing arranged to receive waste packages, the cartridge being maintainable in a stationary position; a retention mechanism for holding a waste package received in the tubing; and a rotation mechanism arranged to rotate the retention mechanism, and thus a waste package when held by the retention mechanism, while the cartridge is stationary in order to twist the tubing and encapsulate the waste package. In this aspect of the invention, the waste disposal device can further comprise an anti-rotation mechanism for holding the cartridge stationary during rotation of said retention mechanism.

In one embodiment, the waste disposal device comprises a retention mechanism comprising a gear rim, the rotation mechanism engaging with the gear rim to cause rotation of the gear rim and thus the retention mechanism.

In a further embodiment, the waste disposal device comprises a container defining a waste chamber for receiving encapsulated waste packages; a lid coupled to the container and movable between an open position in which chamber is accessible and a closed position in which the chamber is covered; a cartridge arranged in the container and containing a length of flexible tubing arranged to receive waste packages; a retention mechanism for holding a waste package received in the tubing, the retention mechanism being fixed to the container; a rotation mechanism arranged to rotate the cartridge relative to the retention mechanism in order to twist the tubing and encapsulate a waste package when held by the retention mechanism; and a toothed member attached to the lid, the cartridge comprising a gear rim, the rotation mechanism engaging with the toothed member and the gear rim during movement of the lid and comprising at least one gear arranged in the container for enabling the conversion of movement of the lid to rotational movement of the gear rim.

In yet another embodiment, the waste disposal device comprises a container defining a waste chamber for receiving encapsulated waste packages; a lid coupled to the container and movable between an open position in which said chamber is accessible and a closed position in which said chamber is covered; a cartridge arranged in the container and containing a length of flexible tubing arranged to receive waste packages; a retention unit for holding a waste package received in the tubing; and rotation means for rotating the retention unit, and thus a waste package held by the retention unit, relative to the cartridge in order to twist the tubing and encapsulate the waste package.

In another embodiment of the invention, the waste disposal device rotation mechanism comprises a motor having a shaft and providing rotational movement to said shaft; a gear arranged on said shaft and in engagement with said gear rim; and a motor actuation mechanism for actuating said motor to rotate said shaft. In this aspect of the invention, the motor actuation mechanism may comprise, for example, a foot pedal coupled to the motor and arranged such that upon depression of said foot pedal, the motor is actuated.

In another embodiment, the waste disposal device comprises a motor actuation mechanism comprising a pushbutton coupled to said motor such that upon depression of said pushbutton, said motor is actuated. In this aspect of the invention, the motor actuation mechanism may comprise a switch arranged on the container and coupled to the motor, optionally it may include and a plunger arranged on the lid to engage said switch when the lid is closed, the switch being arranged to actuate the motor upon pressured being applied by said plunger.

In yet another embodiment, the waste disposal device comprises a rotation mechanism comprising a pedal arranged in a slot partially outside of the container, a pulley connected to the pedal and a movement converting mechanism for converting unidirectional movement of the pedal in the slot and thus movement of the pulley into rotation of the gear rim.

In a further embodiment, the waste disposal device further comprises a compacting mechanism for compacting the waste packages which is capable of rising from the base of the device.

In yet another embodiment, the waste disposal device comprises a rotation mechanism, which comprises: a frame defining a waste passage through which the waste packages pass; resilient members connected to the frame and extending inward into the waste passage to engage with the waste packages; a handle situated at least partially outside of the container, the handle being movable in a slot in an outer wall of container; and movement converting means for converting movement of the handle into unidirectional rotational movement of the frame to thereby rotate the frame, the resilient members and a waste package engaged by the resilient members relative to the tubing in the cartridge.

In a further embodiment, the waste disposal device comprises a retention mechanism comprising a pail having a retention member extending upward from a base of the pail and adapted to hold the waste package between said retention member and walls of said pail, said rotation mechanism comprising a turntable arranged below the pail to selectively engage the pail. The turntable may be moved by way of a motor or manually, for example, by a string wound partially about the turntable to cause rotation of the turntable, and thus the pail, when the string is pulled.

In another embodiment the waste disposal device comprises a container comprising a cylindrical outer wall, further comprising an access door formed and pivotally connected to the outer wall.

In yet another embodiment, the waste disposal device comprises a container comprising a cylindrical outer wall and a hamper defining the waste chamber and having an outer wall constituting part of the outer wall of the container, said hamper being removable from the container.

In another embodiment, the waste disposal device comprises a retention mechanism comprising: a frame defining a waste passage through which the waste package passes; resilient springs connected to the frame and extending inward into waste passage to engage with and hold the waste package; a support flange connected to frame for supporting cartridge.

In another embodiment, the waste disposal device further comprises means for holding the cartridge stationary during rotation of the retention mechanism In yet another embodiment, the waste disposal device comprises a rotation mechanism constructed to convert movement of the lid in a downward direction to rotational movement of a gear rim and constructed to prevent movement of the lid in an upward direction from being converted to rotational movement of the gear rim.

In another embodiment, the waste disposal device comprises means for holding the cartridge stationary during rotation of the retention unit.

In another embodiment, the waste disposal device comprises a retention unit comprising a gear ring and a plurality of resilient springs adapted to engage with the waste package, the rotation means engaging with the gear ring to cause rotation of gear ring and thus the retention unit. In this aspect of the invention, the gear ring comprises a gear rim engaging with the rotation means and an adapter rim interposed between and coupled to the gear rim and the cartridge for coupling the cartridge to the gear rim.

In a further embodiment, the waste disposal device comprises a rotation means comprising a motor having a shaft and providing rotational movement to the shaft, a gear arranged on the shaft and in engagement with the gear ring and a motor actuation mechanism for actuating the motor to rotate the shaft. In this embodiment, the motor actuation mechanism may comprise a foot pedal coupled to the motor and arranged such that upon depression of the foot pedal, the motor is actuated. The motor actuation mechanism may also, for example, comprise a pushbutton coupled to the motor such that upon depression of the pushbutton, the motor is actuated. In an alternate aspect of this embodiment of the invention, the motor actuation mechanism may comprise a switch arranged on said container and coupled to the motor and a plunger arranged on the lid to engage the switch when the lid is closed.

In another aspect of the invention, the waste disposal device comprises a retention unit comprising a frame defining a waste passage through which the waste package passes; resilient springs connected to the frame and extending inward into the waste passage to engage with and hold the waste package; a support flange connected to the frame for supporting the cartridge.

In another embodiment, the waste disposal device comprises a container defining a waste chamber for receiving encapsulated waste packages; a lid coupled to the container and movable between an open position in which the chamber is accessible and a closed position in which the chamber is covered; a toothed member attached to the lid; a cartridge arranged in the container and containing a length of flexible tubing arranged to receive waste packages; a retention mechanism for holding a waste package received in the tubing, the retention mechanism comprising a gear rim; and a rotation mechanism for rotating the retention mechanism relative to the cartridge in order to twist the tubing and encapsulate a waste package received in the tubing, the rotation mechanism engaging with the toothed member and the gear rim during movement of the lid and comprising at least one gear for enabling the conversion of movement of the lid to rotational movement of the gear rim and thus the retention mechanism The toothed member can comprise a rack gear having a series of teeth on an outer or inner arcuate surface.

In yet another embodiment the waste disposal device comprises a retention mechanism further comprising a frame attached to the gear rim and including a plurality of resilient springs adapted to engage with the waste package. In this aspect of the invention, the rotation mechanism is constructed to convert movement of the lid in a downward direction to rotational movement of the gear rim and prevent movement of the lid in an upward direction from being converted to rotational movement of the gear rim. The waste disposal device may comprise an anti-rotation mechanism for holding the cartridge stationary during rotation of the retention mechanism.

In a further embodiment, the waste disposal device comprises a container defining a waste chamber for receiving encapsulated waste packages; a lid coupled to the container and movable between an open position in which the chamber is accessible and a closed position in which the chamber is covered; a cartridge arranged in the container and containing a length of flexible tubing arranged to receive waste packages; a retention mechanism for holding a waste package received in the tubing; a rotation mechanism for rotating the retention mechanism relative to the cartridge in order to twist the tubing and encapsulate a waste package when held by the retention mechanism; and compacting means for compacting the waste packages.

The invention also provides a waste storage device comprising a container comprising a receptacle and a lid attached to the receptacle, a retention mechanism and a rotation mechanism for rotating the cassette or cartridge, the cassette or cartridge comprising a flexible tubing for packaging waste material, the cassette further comprising a sensing mechanism for activating an electronic detection mechanism for counting revolutions of the cassette during operation of the device to ensure consistency of the sealing mechanism after each use.

Other and further objects, advantages and features of the present invention will be understood by reference to the following.

BRIEF DESCRIPTION OF THE DRAWINGS

A more complete appreciation of the invention and the advantages thereof will be more readily apparent by reference to the detailed description of the preferred embodiments when considered in connection with the accompanying figures, wherein.

It is notable that like items depicted in different figures may be referred to by the same reference numbers.

DETAILED DESCRIPTION OF THE INVENTION

Figure 1:
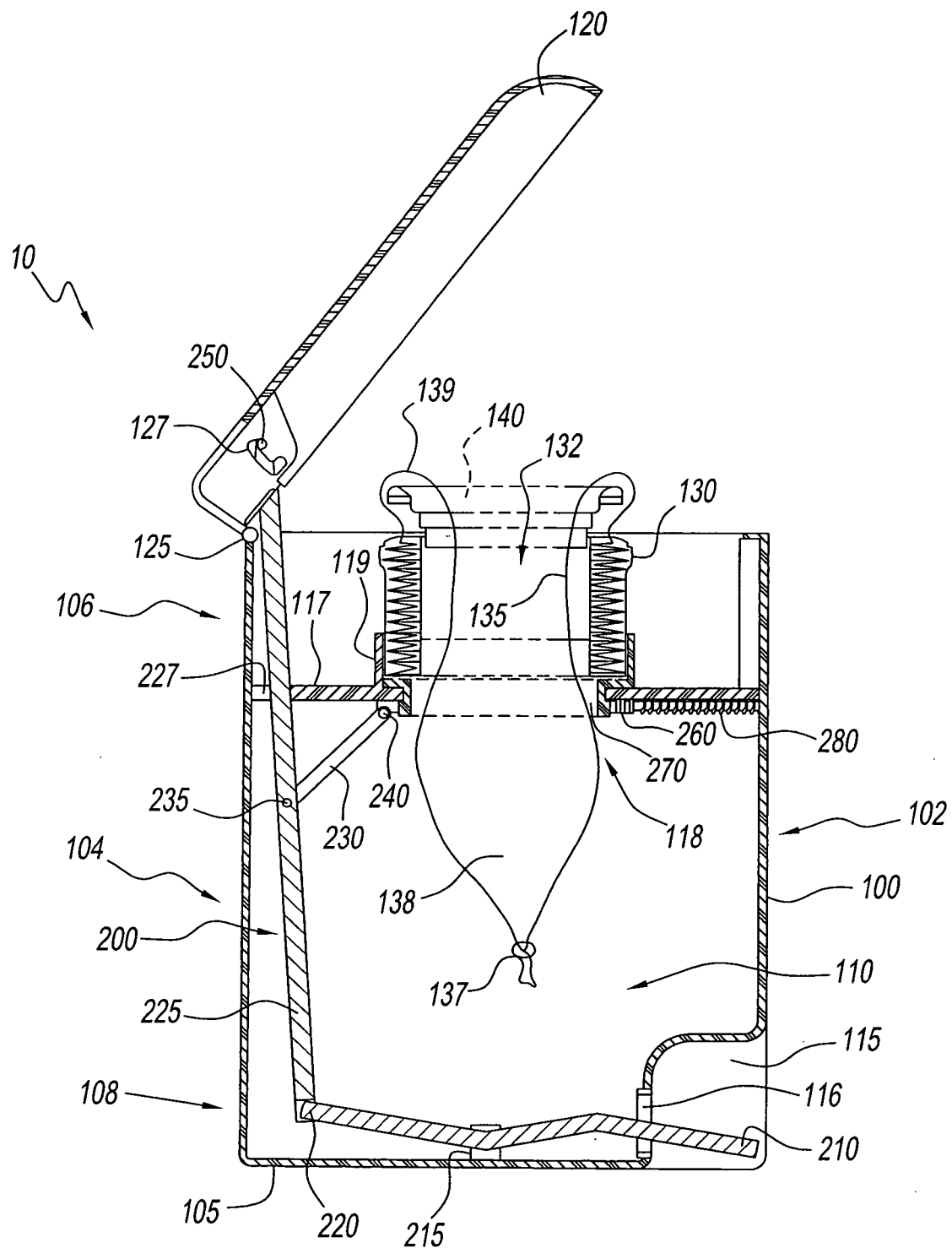
FIG. 1 is a cross-sectional plane view of a waste storage device having the sealing mechanism of the present invention.
Figure 2:
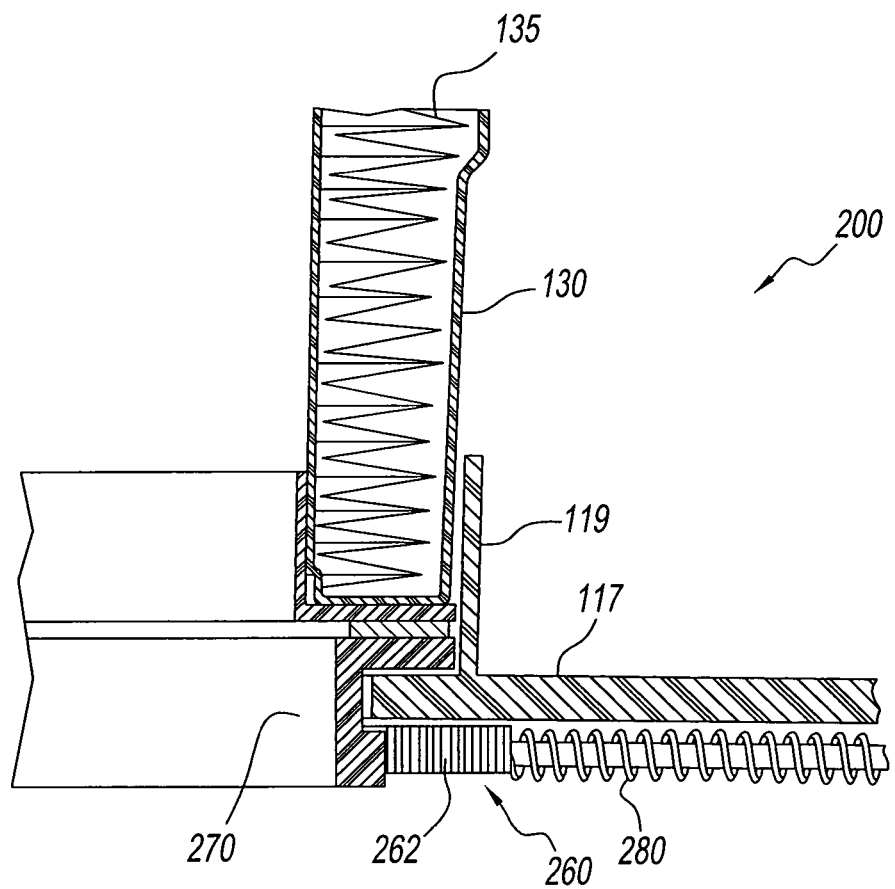
FIG. 2 is a cross-sectional plane view of a portion of the sealing mechanism of FIG. 1.
Figure 3:
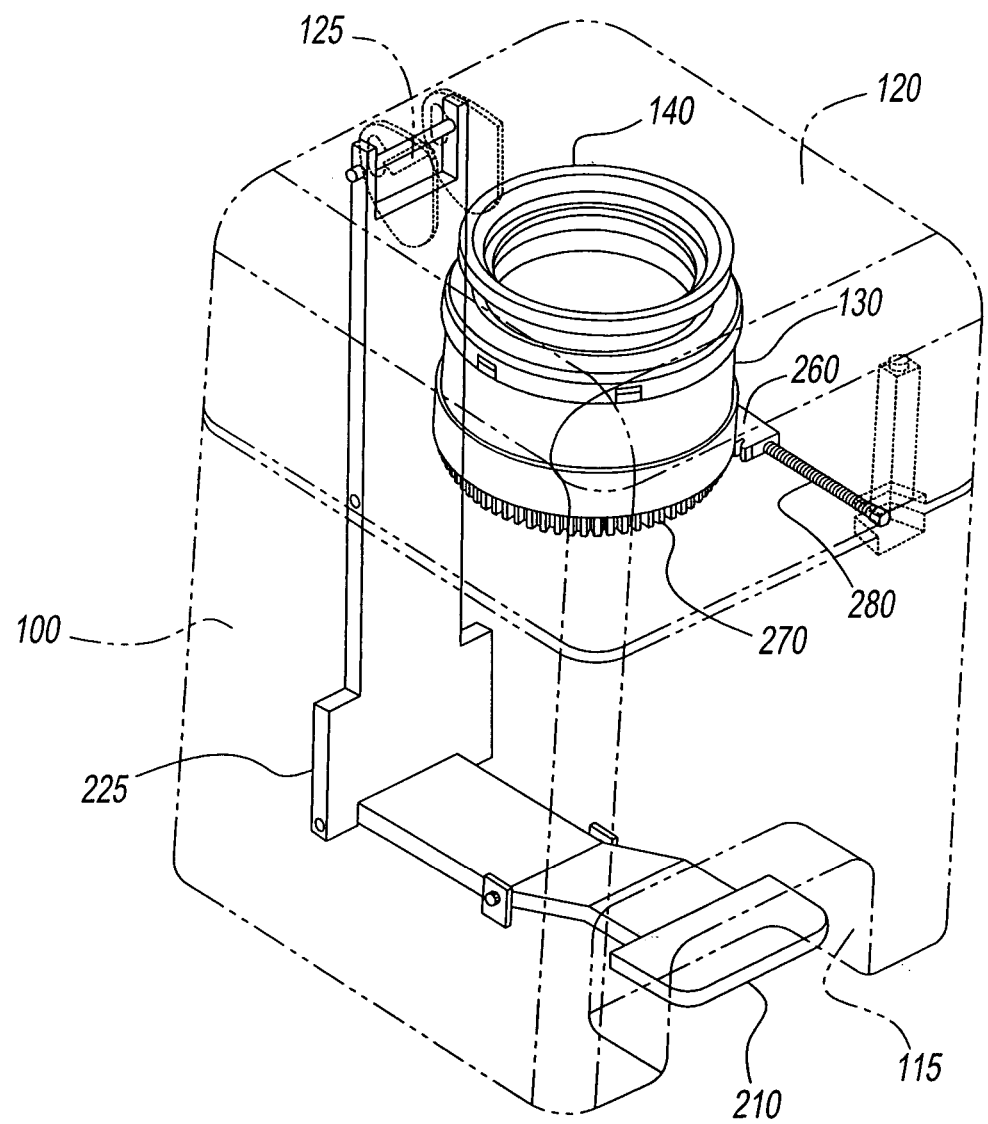
FIG. 3 is a perspective view of the waste storage device of FIG. 1.
Figure 4:
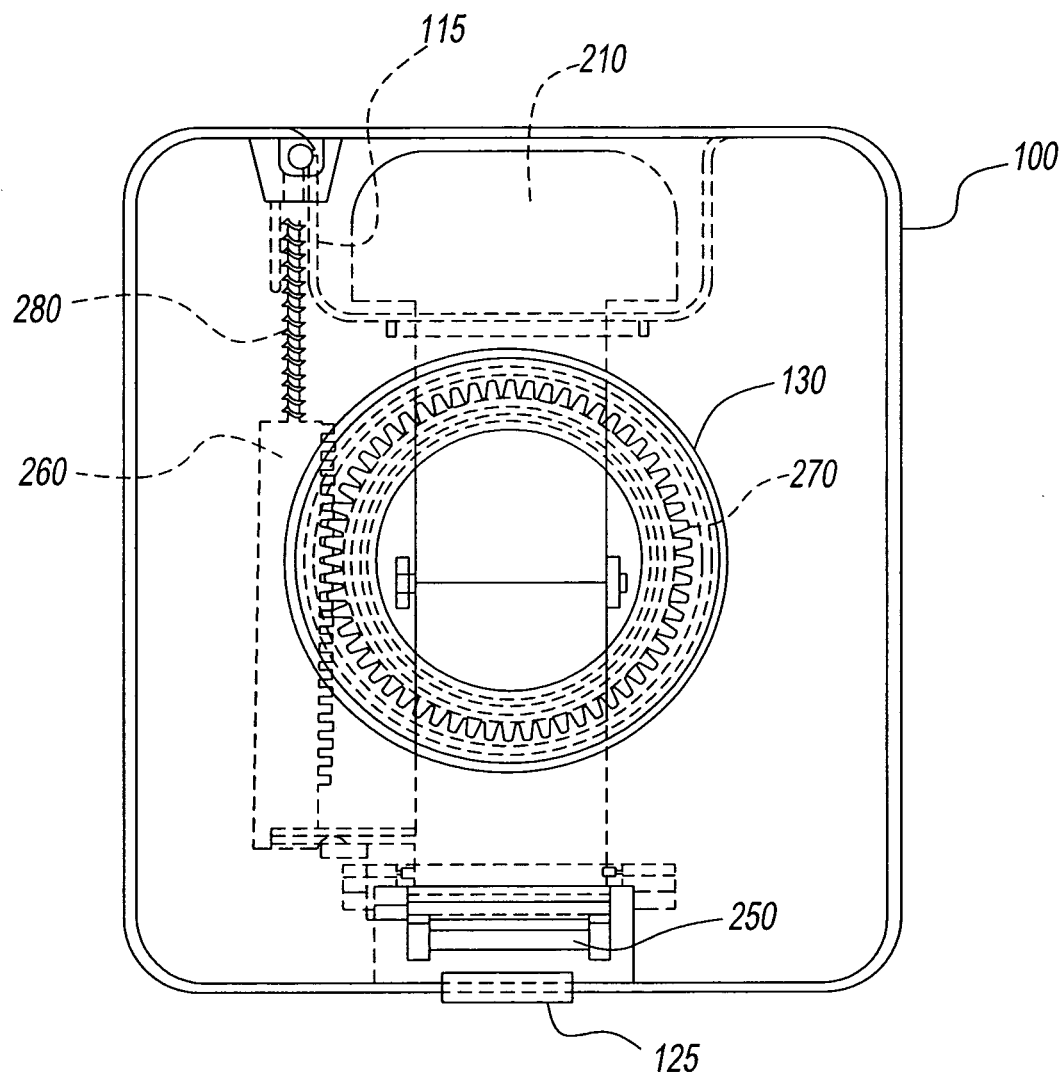
FIG. 4 is a top view of the waste storage device of FIG. 1 without the lid.

Referring to FIG. 1, there is shown an embodiment of a waste storage device having the sealing mechanism of the present invention, generally represented by reference numeral 10.

Waste storage device 10 has a body 100, a lid 120, a storage film cassette 130, a film ring 140 and a sealing mechanism 200. Body 100 has a base 105, an inner volume 110, front and rear portions 102, 104, and upper and lower portions 106, 108. Body 100 is substantially cylindrical in shape to maximize inner volume 110. However, alternative shapes for body 100 can also be used including rectangular or cubical. Lower portion 108 of body 100 has an indentation or pedal housing 115 that will be described later in greater detail. Preferably, pedal housing 115 is positioned along front portion 102.

Lid 120 is substantially cylindrical in shape and has a diameter substantially the same size as the diameter of body 100 to provide a sealing engagement of the lid with the body along upper portion 106. If an alternative shape of body 100 is used, such as rectangular or cubical, then the corresponding shape would also be used for lid 120 to provide a sealing engagement of the lid and the body along upper portion 106. Lid 120 is pivotally connected to body 100 by lid hinge 125. Preferably, lid hinge 125 is positioned along rear portion 104. Lid 120 has a lid slot 127 formed therein. Lid slot 127 is a u-shaped channel that is operably connected to sealing mechanism 200 to allow a user to open and close lid 120, which will be discussed later in greater detail.

Body 100 further has a cassette flange 117 with a center hole 118 and a circular wall 119. Flange 117 is circumferentially formed along the inner wall of body 100 in proximity to upper portion 106. Flange 117 engages with a clutch 270 of sealing mechanism 200, which will be discussed later in greater detail. Center hole 118 provides a support for clutch 270 and for cassette 130, which is seated on the clutch. Circular wall 119 extends substantially vertically upward from flange 117. As used herein, vertical refers to the direction between upper an lower portions 106, 108, which is substantially parallel with the sidewalls defining body 100. Horizontal refers to the direction between front and rear portions 102, 104, which is substantially perpendicular to the sidewalls defining body 100. Circular wall 119 has a diameter larger than the diameter of cassette 100. Circular wall 119 provides support for cassette 130 to prevent it from moving in a horizontal direction yet allowing it to rotate in center hole 118.

Cassette 130 preferably has a cylindrical or ring-like shape with a center opening 132. Film 135 is a continuous sheet of film having a cylindrical shape that is stored in cassette 130. Cassette 130 also has a film ring 140 that is positioned in center opening 132. Film 135 is dispensed from the top of cassette 130 over the outside of film ring 140 and then down through the film ring and down through center opening 132 into inner volume 110. Film 135 is tied off or sealed at lower end 137 of the film in inner volume 110 to provide a storage volume 138. As will be discussed later in greater detail, in the preferred embodiment, after a diaper is inserted in storage volume 138, sealing mechanism 200 rotates cassette 130 to seal film upper end 139.

Referring to FIGS. 1 through 4, a sealing mechanism 200 of the present invention is shown. Sealing mechanism 200 has an actuator 210 a foot pedal linkage 225, a rack linkage 230, a rack gear 260, a clutch 270 and a biasing mechanism 280. In the preferred embodiment, actuator 210 is a foot pedal and is angled downward for facilitating operation by a user's foot. Pedal 210 protrudes out from body 100 through pedal orifice 116 and into pedal housing 115. Pedal housing 115 has a height that allows a user to slide his or her foot into the housing and onto pedal 210. Pedal 210 is pivotally connected to base 105 of body 100 at pedal pivot 215. This pivotal connection translates the user's downward force into an upward force for opening lid 120.

Pedal 210 is pivotally connected to foot pedal linkage 225 at pedal linkage pivot 220. This pivotal connection translates the rotational movement of pedal 210 into a substantially vertical movement of pedal linkage 225. Pedal linkage 225 extends substantially vertically from lower portion 108 of body 100, through flange opening 227, through upper portion 106 of body 100, to lid 120. Pedal linkage 225 is pivotally secured to lid 120 such that an upward force along the pedal linkage causes the lid to rotate about lid hinge 125. In this embodiment, pedal linkage 225 is operably connected to lid 120 by lid slot 127 and lid tongue 250. Lid slot 127 is preferably a unshaped channel formed in lid 120. Lid tongue 250 is preferably a cylindrical tongue that engages with lid slot 127. Preferably, lid tongue 250 has a cap to secure the tongue in lid slot 127.

Pedal linkage 225 is also pivotally connected to rack linkage 230 at rack pivot 235. Rack linkage 230 is pivotally connected to rack gear 260 at rack pivot 240. The pivotal connections at rack pivots 235, 240 translate the substantially vertical movement of pedal linkage 225 into a substantially horizontal movement of rack linkage 230 and rack gear 260.

Rack gear 260 is operably connected to clutch 270 so that a horizontal movement of the rack gear causes the clutch to rotate. In this embodiment, clutch 270 has gears (not shown) that engage with gears 262 of rack gear 260. Rack gear 260 is further connected to a biasing mechanism 280 positioned on the opposite end of the rack gear from rack pivot 240. In this embodiment, biasing mechanism 280 is a coil spring that biases rack gear 260 toward rear portion 104 of body 100.

Clutch 270 is removably connected to cartridge 130. Clutch 270 is a one-way clutch that only permits rotation of cartridge 130 in one direction. Thus, rack gear 260 can horizontally move in two directions and clutch 270 can rotationally move in two directions. However, cassette 130 can only rotate in one direction.

In operation, when a user depresses pedal 210, pedal linkage 225 moves in an upward direction. This upward movement of pedal linkage 225 causes lid 120 to rotate about lid hinge 125 toward rear portion 104 of body 100. Thus, depressing pedal 210 causes the lid to open.

Simultaneously, the upward movement of pedal linkage 225 causes rack linkage 230 to move substantially horizontally toward front portion 102 of body 100. This causes rack gear 260 to move horizontally toward front portion 102. Rack gear 260 is operably connected to clutch 270, which causes the clutch to rotate in a first direction. Cassette 130 remains stationary because clutch 270 is a one-way clutch and prevents the cassette from rotating in this first direction. The horizontal movement of rack gear 260 towards front portion 102 also causes spring 280 to compress.

With lid 120 in an open position and storage volume 138 accessible to the user, waste storage, such as a diaper, can be inserted through film ring 140 into the storage volume. The user then releases pedal 210 to commence the sealing operation. The force of compressed spring 280 against rack gear 260 causes the rack gear to horizontally move back toward rear portion 104. The horizontal movement of rack gear 260 toward rear portion 104 causes clutch 270 to rotate in a second, opposite direction. Cassette 130 rotates in this second direction. The rotation of cassette 130 causes film 135 to tie off or seal near film upper end 139. Thus, release of pedal 210 causes sealing mechanism 200 to seal film 135.

Simultaneously, the horizontal movement of rack gear 260 toward rear portion 104 causes rack linkage 230 to move toward rear portion 104. The horizontal movement of rack linkage 230 toward rear portion 104 causes movement of pedal linkage 225 in a substantially downward direction toward base 105. The movement of pedal linkage 225 in a substantially downward direction causes lid 120 to rotate about lid hinge 125 toward front portion 102. Thus, release of pedal 210 causes sealing mechanism to close lid 120.

Figure 5:
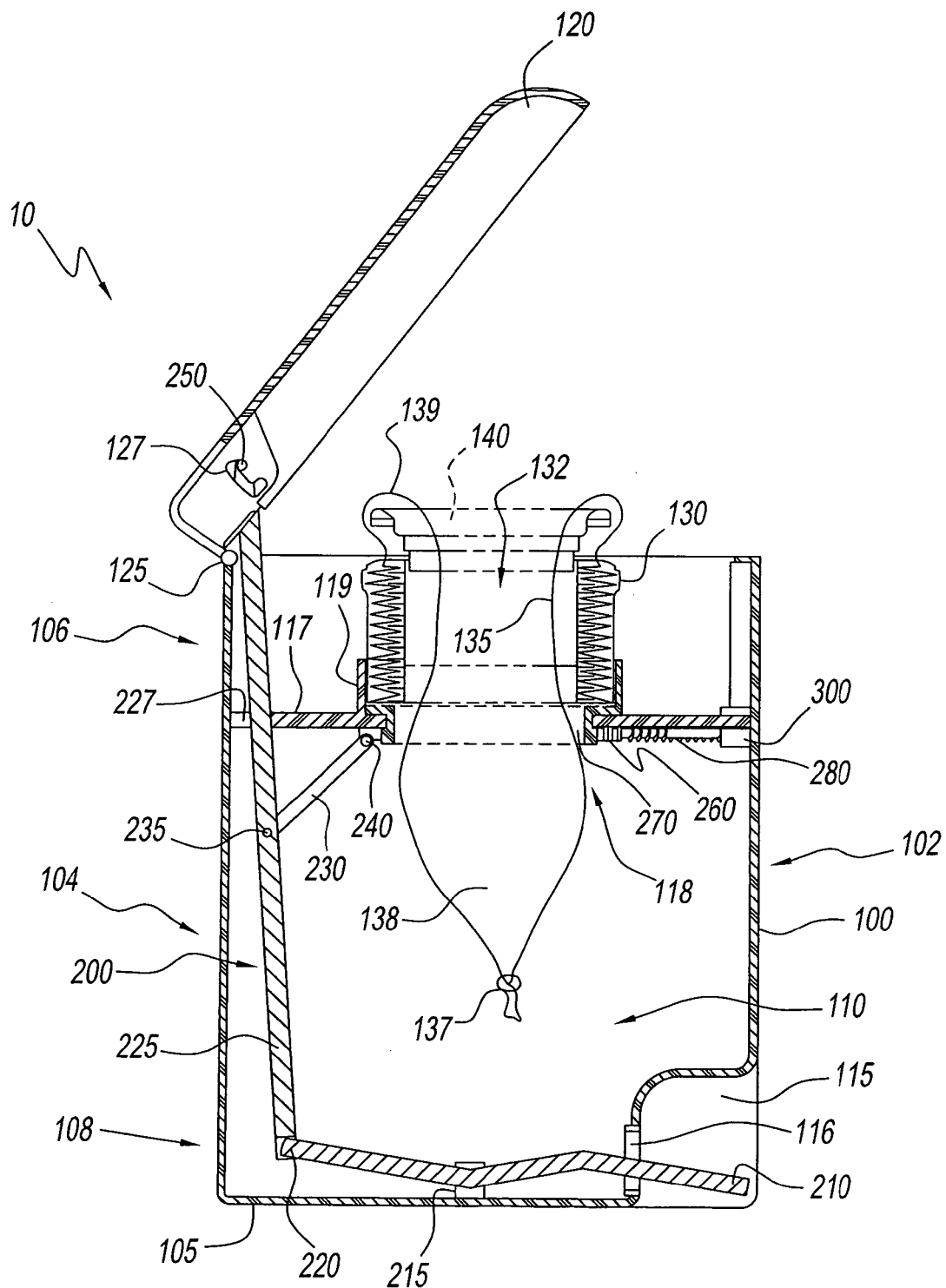
FIG. 5 is a cross-sectional plan view of a waste storage device having a second embodiment of the sealing mechanism of the present invention.
Figure 6:
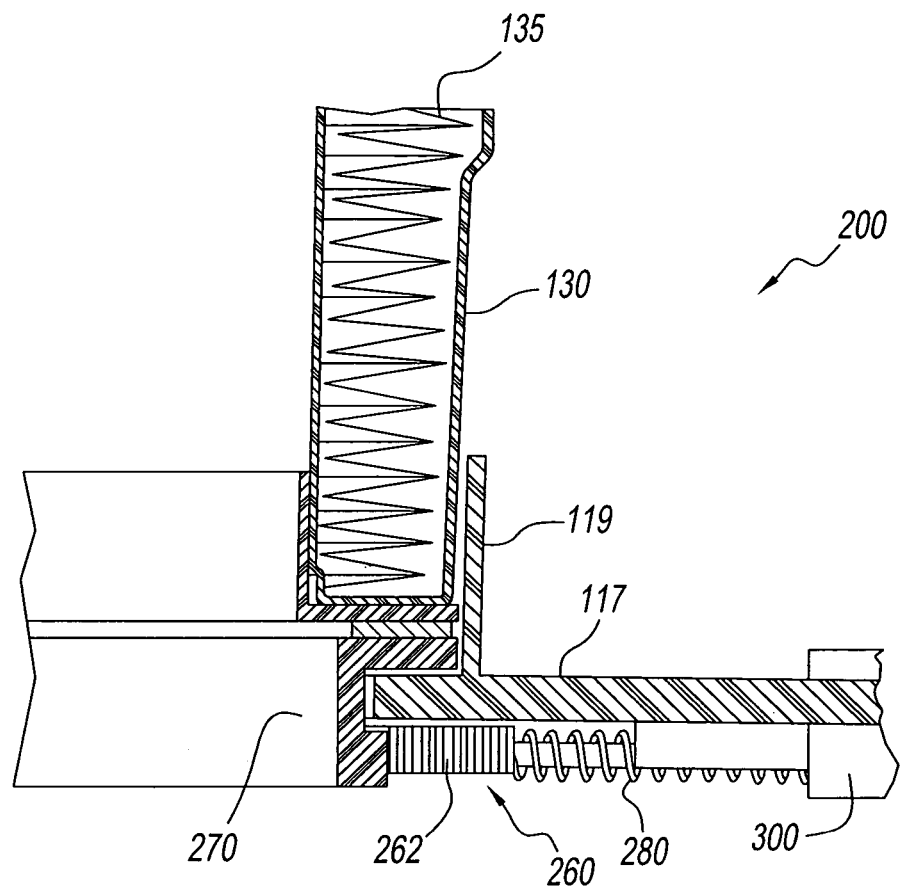
FIG. 6 is a cross-sectional plan view of a portion of the sealing mechanism of FIG. 3.
Figure 7:
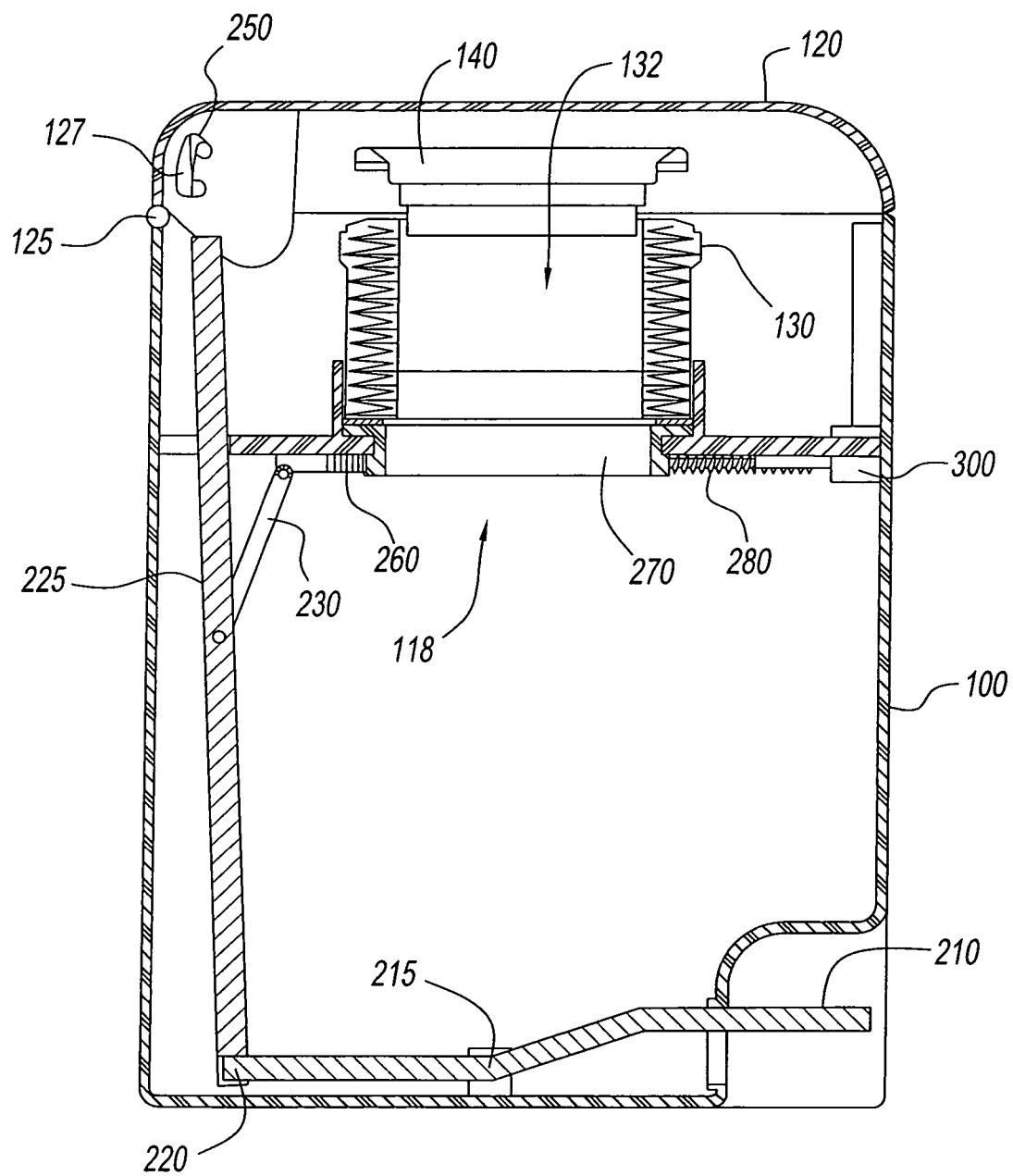
FIG. 7 is a cross-sectional plan view of the waste storage device of FIG. 5 with the lid closed.

Referring to FIGS. 5 through 7, in an alternative embodiment, sealing mechanism 200 also has a locking mechanism 300. Locking mechanism 300 is operably connected to spring 280. When a user first actuates pedal 210 causing rack gear 260 to move toward front portion 102 and compressing spring 280, locking mechanism 300 is triggered and locks spring 280 in a compressed position. Thus, lid 120 remains in an open position and a user can release his or her foot from pedal 210. When a user actuates pedal 210 for a second time causing rack gear 260 to move further toward front portion 102 and further compressing spring 280, locking mechanism 300 is again triggered and unlocks spring 280 from a compressed position. Rack gear 260 is moved back toward rear portion 104 under the force of spring 280 causing rotation of clutch 270 and cassette 130, as well as downward movement of pedal linkage 225. Thus, film 135 is sealed by the rotation of cassette 130 and lid 120 is closed by the downward movement of pedal linkage 225. Pedal 210 returns to its upper position for the sealing operation to be repeated by a first and second downward depression of the pedal.

The automated twist waste disposal apparatus useful for sequestering waste packets such as diapers in twist-sealable flexible tubing is illustrated in one embodiment of the invention by taking reference to FIGS. 8 through 12.

Figure 8:
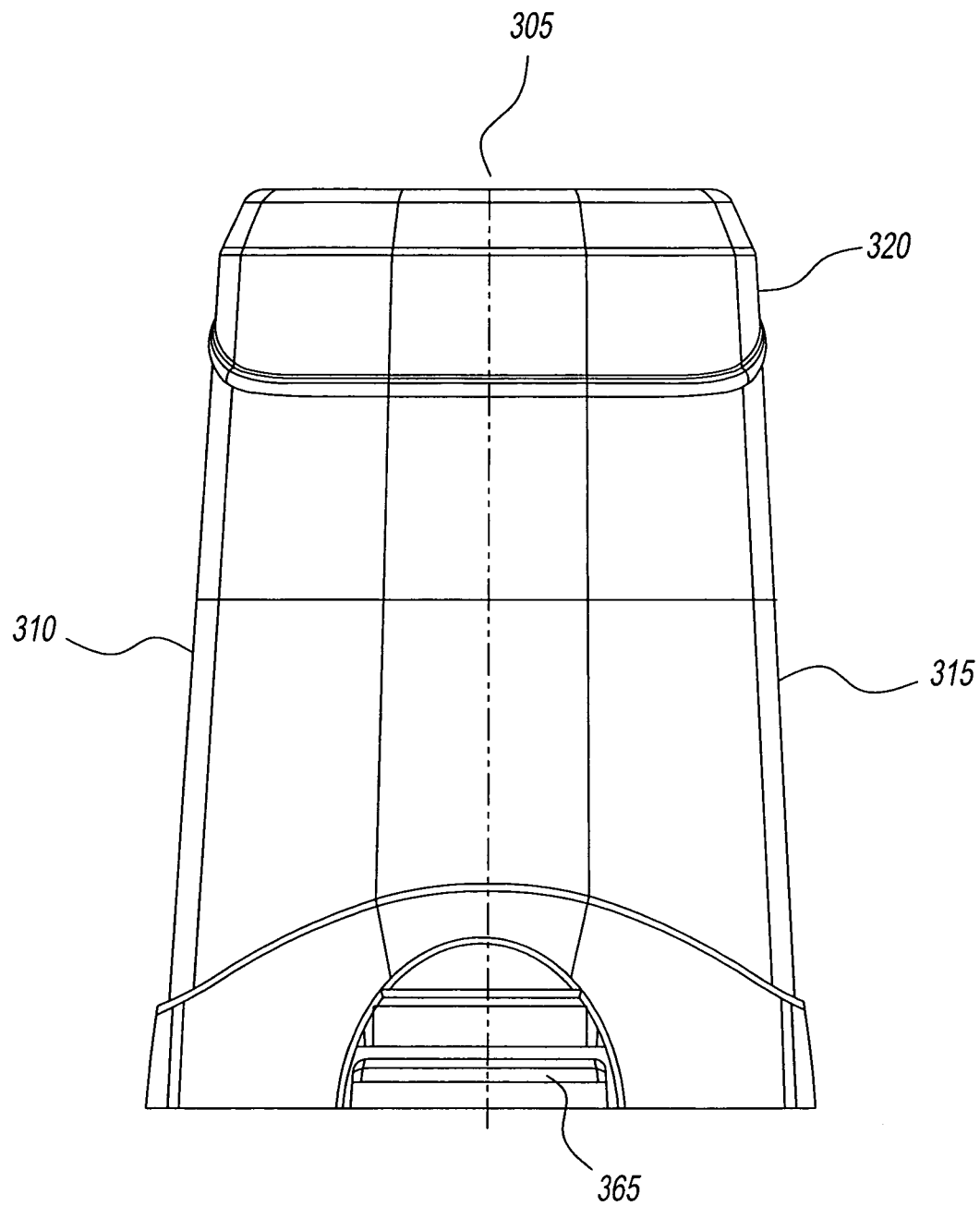
FIG. 8 is an elevational side view of one embodiment of the present invention.

Referring to FIG. 8, a waste container 310 is shown comprising a lower or waste storing bin compartment 315 and an upper lid or head compartment 320 with an optional activation start button 305.

The disposal device 310 comprises a top or lid portion 320, which comprises hingedly attached and latch-secured pivoting lid or cover configuration and a bottom or bin portion 315, comprising an approximately cylindrical or cone-like shape.

Figure 9:
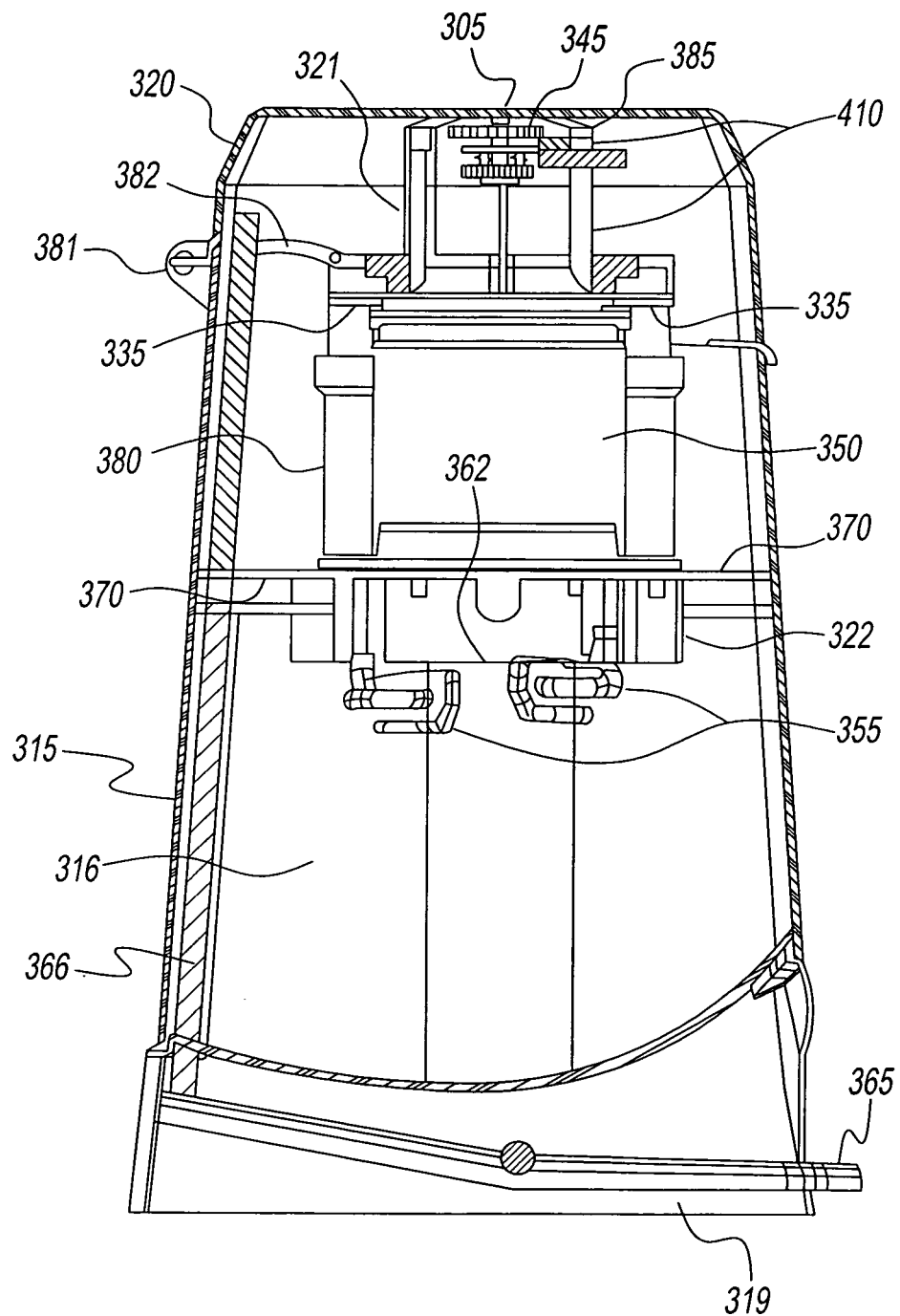
FIG. 9 is a sectional side view of the embodiment of FIG. 8.

In FIG. 9, the lid portion 320 is shown to contain an apparatus for automatic control of twisting and lowering of tubing below the refill cassette, the apparatus comprising an upper body portion 321 and a lower body portion 322. More specifically, the lid 320 houses or contains the apparatus upper body 321, comprising an electronic motor-driven control gear assembly 410, an actuator 345, a rotatory grip is a ring or refill twister 334 for contacting and rotating the tubing refill cassette body 350 effectively twisting the flexible tubing 352 which emanates through a gap 354 between the rim 357 of the cassette 350 and the core tube 361, and is folded down through the open cassette tube core area 351 into the interior bin space 316 as partially shown in FIGS. 10 and 11.

The lower body of apparatus 322 encompasses the removable refill cassette 350 (FIG. 10) as well as a retaining means or spring assembly 355 positioned to hold the flexible tubing 352 which encloses a waste pack (not shown) in the bin space 316 during the twist-closure operation. The tubing cassette 350 houses a length of tubing material 352 for sequestering the waste packets sequentially in the waste bin space 316.

Figure 11:
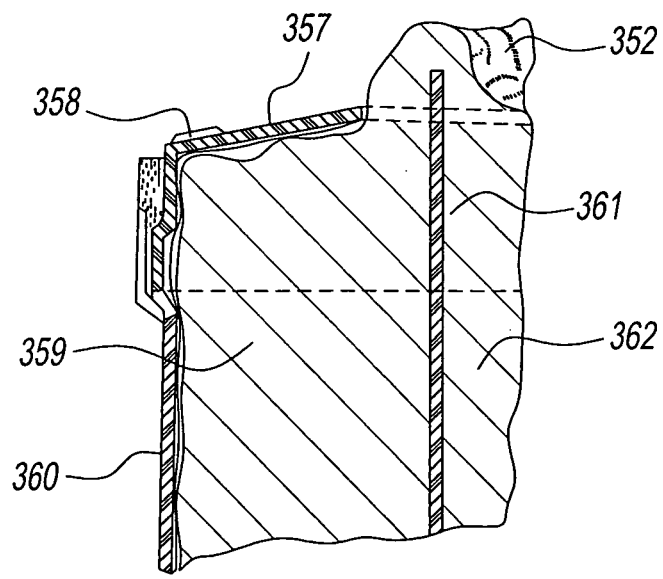
FIG. 11 is a sectional side view of the refill cassette of FIG. 10.

A lid 320 secured by a hinge 381 to the waste bin 315 includes a latch 382. The waste bin 316 also includes a hinged base 319 for providing access to the lower interior of the second waste bin 316. The hinged base 319 (FIG. 9) includes a latch (not shown) for securing the hinged base 319 in a closed position (FIG. 11).

The bottom rim 358 of the tubing refill cassette body 350 rests on a flange support or holding ring 370 which is affixed to the internal wall side of the bin 315 of the device 310. The flexible tubing material 352 is stored in a continuously folded manner in the tubing storage compartment 359 of the cassette 350.

Figure 12:
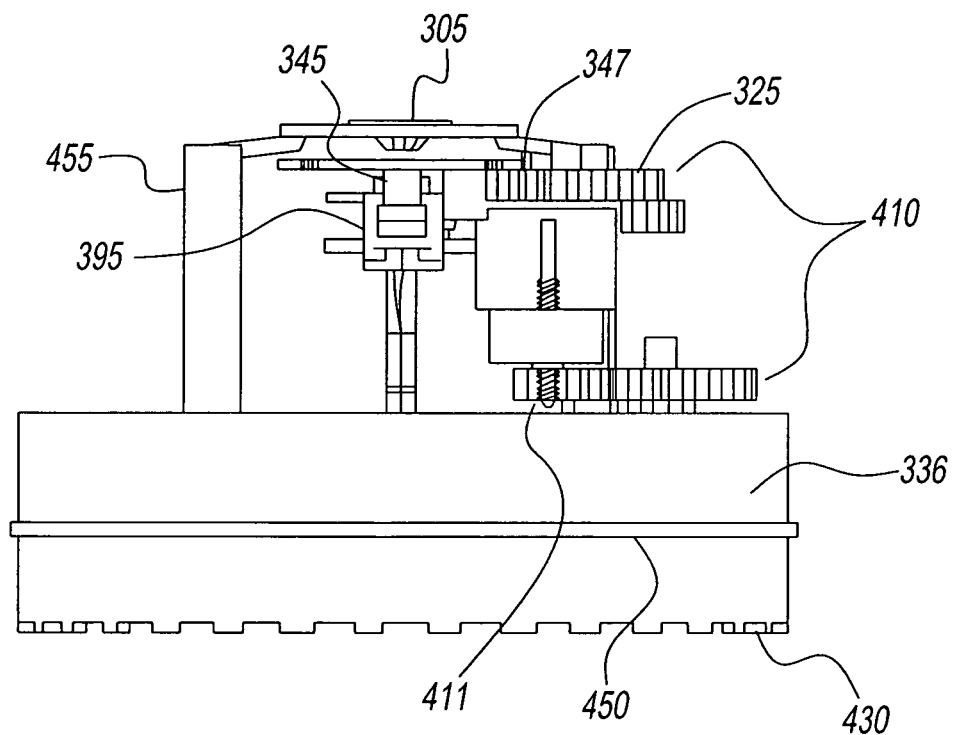
FIG. 12 is an elevational view of an embodiment of the refill twister apparatus.

Referring to FIG. 12, the apparatus embodiment of the gear assembly 410 in a housing or cap structure 455 of the upper body portion 321 of the electronic motor-driving apparatus 330 has a motor 347 located near the gear idler 325, which motor 347 is started when the manually depressed button 305 on the lid 315 makes contact with the switch 395. The first action of the motor-driven gear assembly causes rotation of the refill twister 334 comprising a tubular ring structure 336 which exhibits a notched bottom surface 430 that is situated to make contact with the top ring or collar of the refill cassette 350 so as to propel the cassette into rotational motion. The tubular ring structure 336 is provided with a ridge 450.

Figure 13:
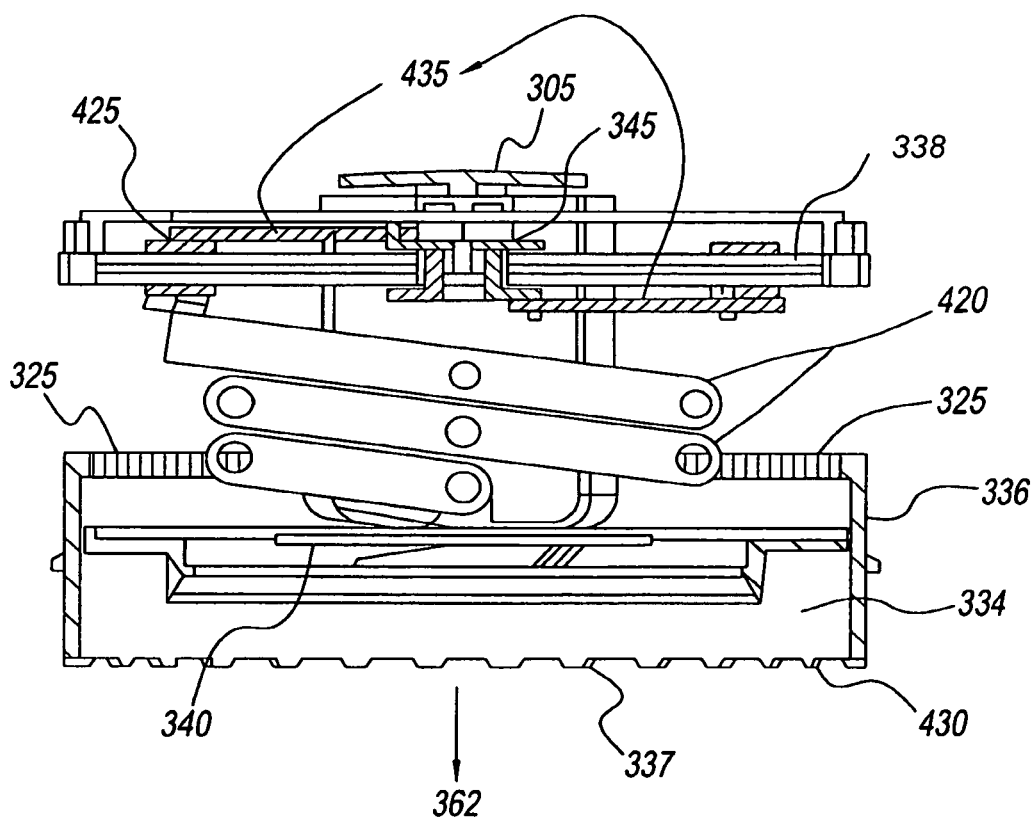
FIG. 13 is a sectional view of the refill twister embodiment of FIG. 12.
Figure 14:
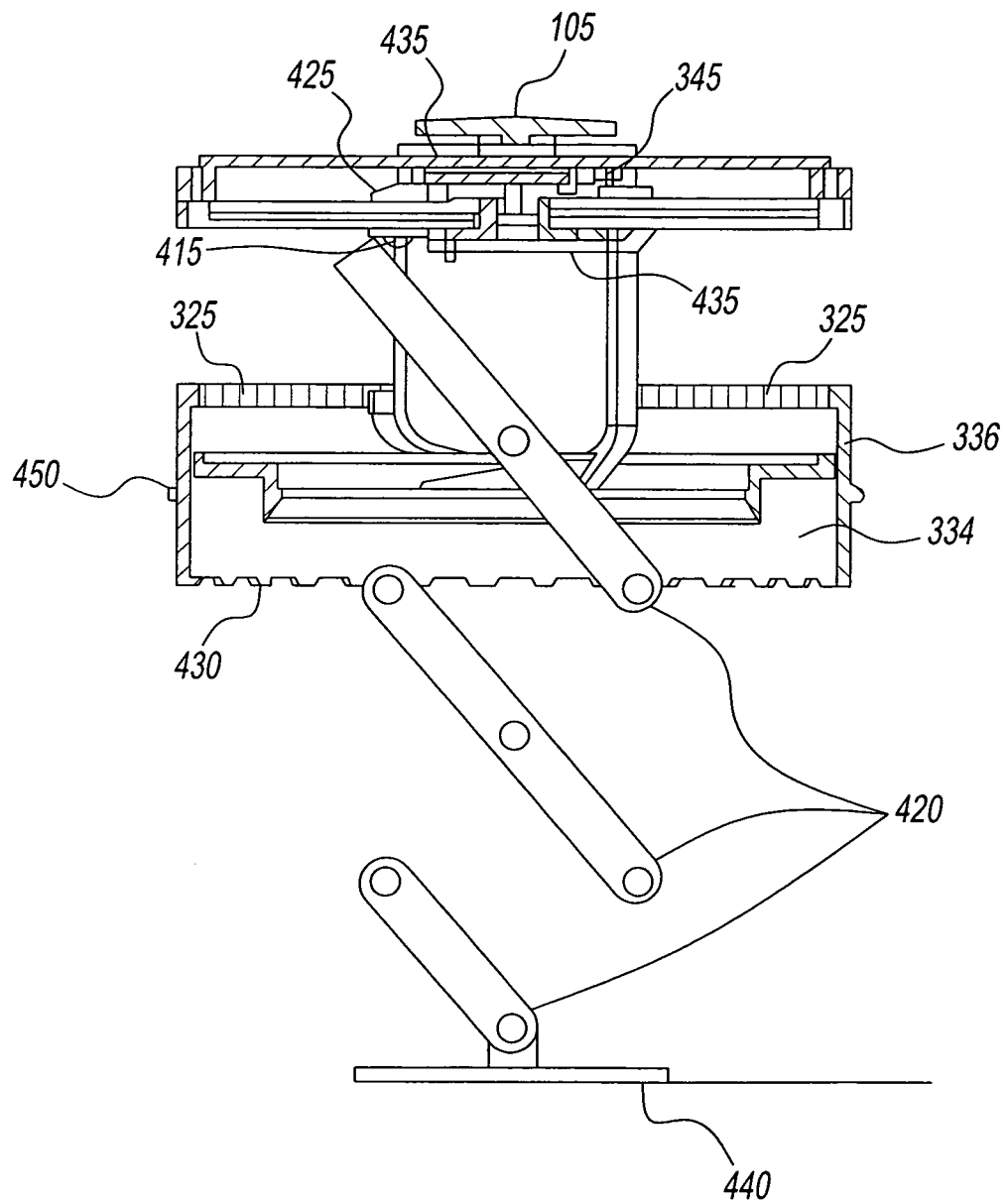
FIG. 14 is a sectional view of an extended plunger mechanism embodiment.

Referring to FIGS. 13 and 14, an embodiment of the invention is represented showing a scissor link assembly 420 linked to a scissor link connecting linkage or slideable U-joint type linkage 415. The pinion is saddled on a radially positioned carrier device 338 with a bracket 425 while at one point attached to a linkage 420 connecting assembly holder 415, and at another point attached to a drive rod 435. The drive rod 435 comprising a screw-like wound surface is inserted into the nut-type center of the which can be centrally moved along the radially positioned carrier device 338 by the revolutions of the screw-type positioning rod so that the drive rod 435 rotations cause the scissor link connecting linkage 415 to move towards the center so as to move the plunger plate 440 vertically downward through open central portion 337 of the upper apparatus configuration 321 and the cassette core opening 362.

The twisting operation may further facilitated by the film grip ring 335 which, during the twisting operation, acts as a brake pressing onto the flexible tubing 352 atop the cassette core tube 361, and prevents the tubing 352 from being pulled out of the refill cassette 350 storage compartment 360 during the cassette rotation.

Figure 10:
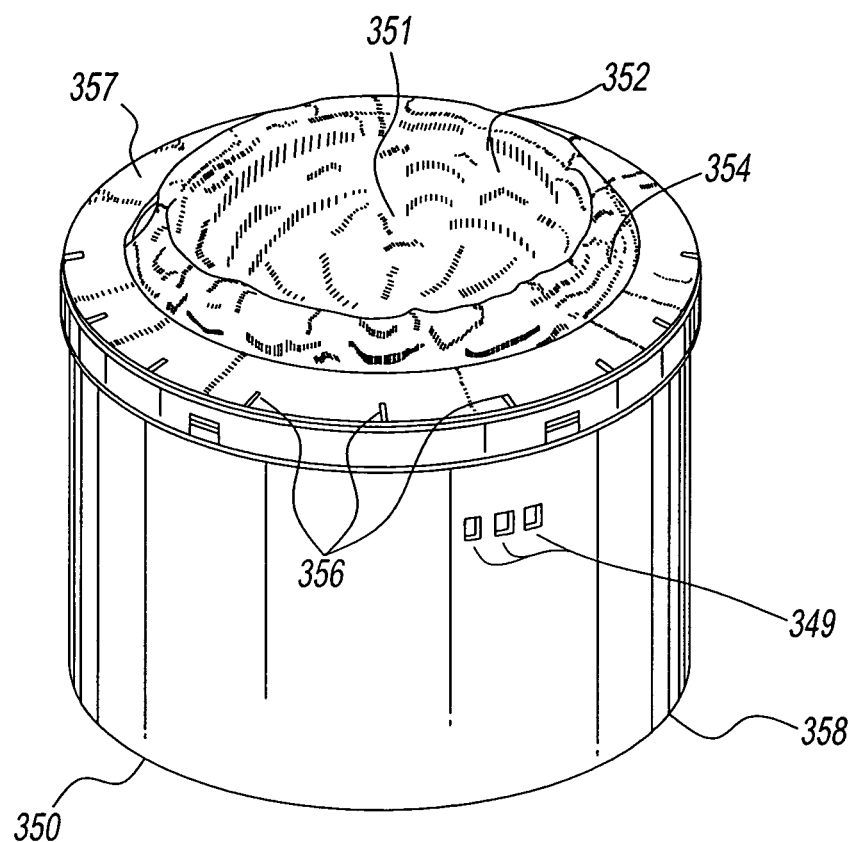
FIG. 10 is an elevational view of a refill cassette embodiment of the invention.

A revolution counting mechanism may optionally provided in an embodiment of the invention. In this embodiment of the invention, the revolution counting mechanism can be in the form of an electronic sensing device (not shown), for example, which utilizes a laser beam mechanism. As seen in FIG. 10, a series of small apertures 349 can be incorporated, for example, into the cassette 350 which can be detected by a laser beam as the cassette rotates on a stationary retention mechanism. The small aperture 349 or other types of sensing devices such as strips, bars, and/or motion detecting mechanisms and the like can be applied to the rotating portion of the device for counting the revolutions executed by the rotating system. In this manner, the total number of revolutions required to secure the sealing on the encapsulated waste package can be set on the electronic device and the sealing process can be executed with precision at each time waste is disposed into the device. In this aspect of the invention, the electronic sensing system can be set automatically to control the sealing process. Additionally, this electronic sensing system on the device can also control, for example, the downward motion of the plunger 340.

Referring again to the illustrations of FIGS. 10 and 11, the refill cassette 350 stores the flexible tubing 352 which emanates from the storage compartment 359 through the gap 354 between the rim 357 and the cassette's core tube wall 361 and then fords into the inner core area 362, hanging into the bin space 316 below. The rim 357 is provided with small ridges for effectively engaging the refill twister 334, in particular, the gear surface said refill twister 430 when rotating the cassette 350 and the top portion of the flexible tubing enclosing the diaper deposit (not shown). The cassette further may comprise slits 356 on its upper rim 357 for engaging with the bottom portion of the lid to form a secure fit.

Taking reference again to FIG. 9, the lid portion 320 of this embodiment 310 can be opened by depressing a foot pedal arrangement 365 which acts through a push rod 366 on the hinge assembly 381 of the lid 320, exposing the open core area 362 of the refill cassette 350 for depositing a waste packet.

As further illustrated in FIG. 9, the retention springs 355 are attached to the flange 370 and retain or hold a waste package (not shown) stationary while the rotating refill twister 334 causes the cassette collar or rim 357 to rotate the tubing cassette 350 inducing a twisting motion in the flexible tubing 352. As used herein, the term "retention means" shall include any retention device for retaining or restraining a waste package (not shown). The term shall include, for example, retention devices as disclosed in U.S. Pat. Nos. 4,869,049, 5,590,512, 6,170,240, 6,128,890, 6,370,847, and JP 592039015 (P2000-247401 A), the contents of all of which are incorporated by reference herein.

Figure 15:
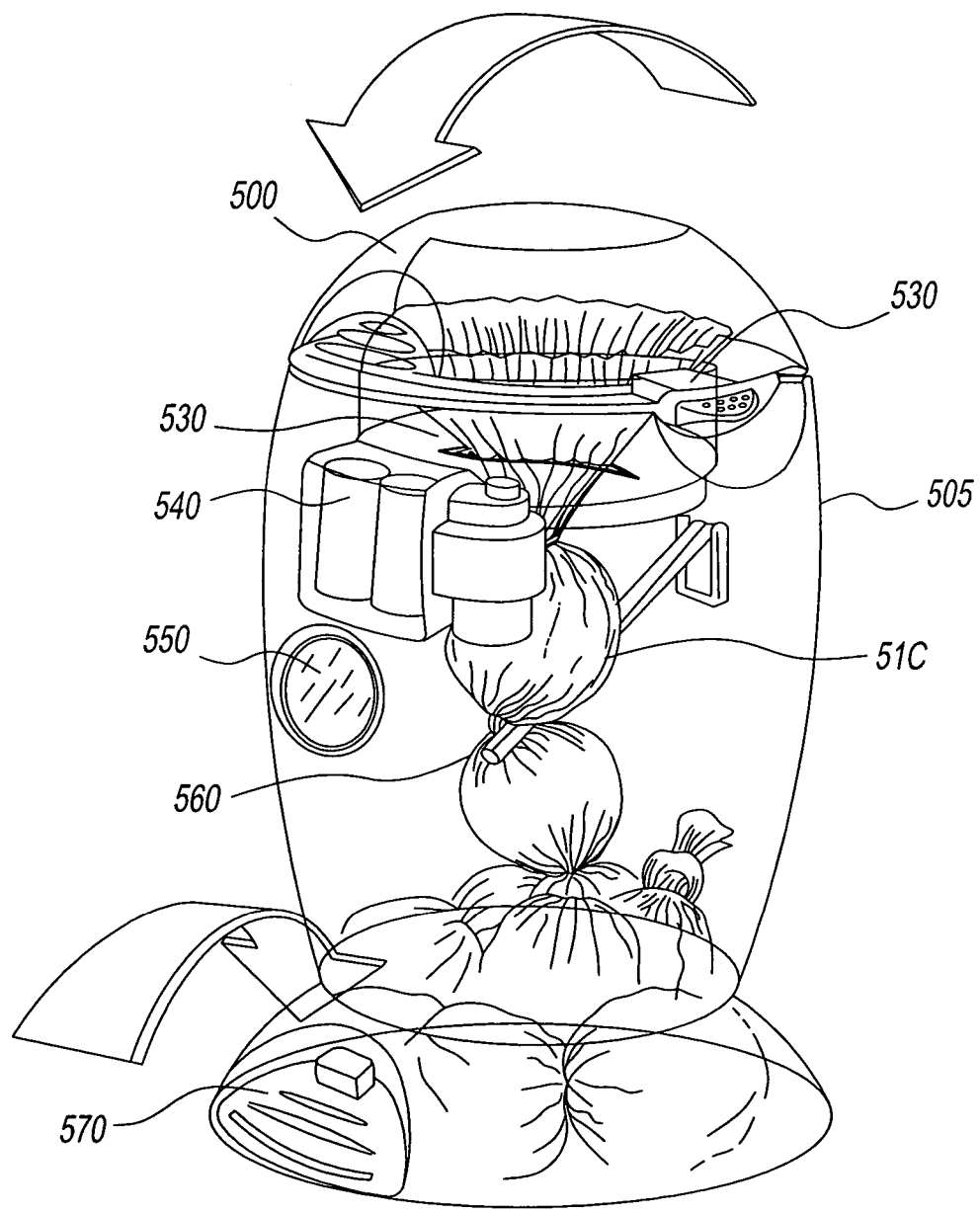
FIG. 15 is a schematic representation of an automated waste storage device embodiment of the invention.

An embodiment of the invention can be further illustrated with reference to FIG. 15. As demonstrated in FIG. 15, the sealing and packaging mechanism of the waste material in the waste storage device is motorized. This device is provided with a pedal 570 for opening the top or lid 500 of the device. Pedal 570 comprises a child-proof mechanism which operates by releasing the spring on the spring-loaded top or lid 500. The spring on the spring-loaded top allows for the top to remain open for a period of time while the device is in used and the spring mechanism closes the lid 500 automatically after the waste material is placed in the tubing. In FIG. 15 the device is provided with a motor 540 which is battery-operated, however, the system can also be powered by alternating (AC) current.

As seen in FIG. 15, the waste storage device can also be provided with a rubber diaphragm rotation mechanism 530 which prevents the backflow or escaping of odors emanating from the waste contained in the storage compartment of the device, and a projecting retention mechanism shown in the drawing in the form of a bar or rod 560 for preventing the bottom portion of the encapsulated waste package 510 from untwisting during the packaging of the another waste material. Thus, the rod 560 operates as an anti-untwisting mechanism a previously encapsulated waste 510. FIG. 15 also shows a push button 520 that can be incorporated into the tubing cutting system of the waste storage device to facilitate the cutting of the tubing prior to disposal of the stored waste. A window 550 can also be designed into the body 505 of the storage compartment for allowing the user to determine when the storage compartment is full.

Figure 16:
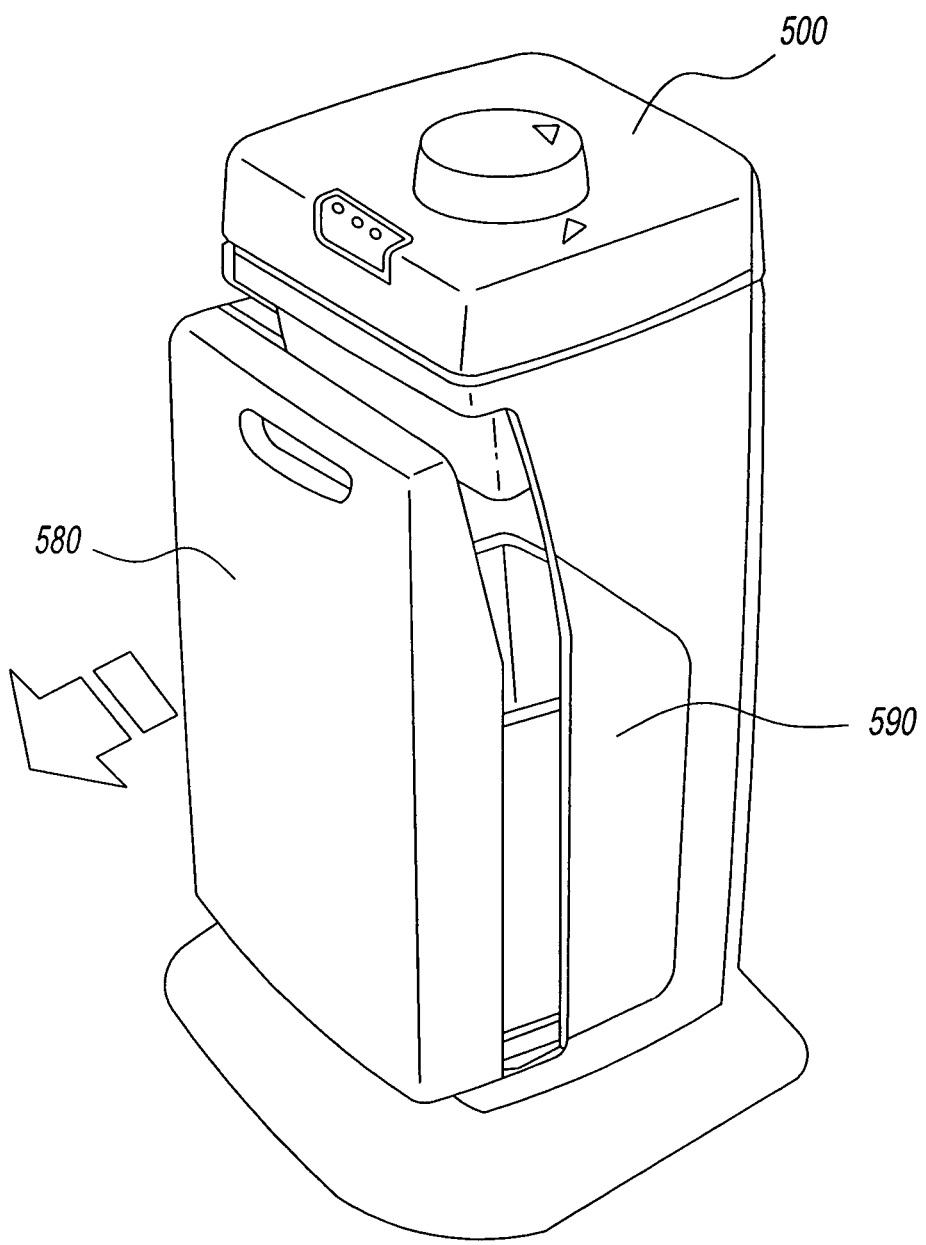
FIG. 16 is a schematic representation of an embodiment of the invention showing a door/drawer-like access to the interior of the storage compartment of the device.

In one embodiment of the invention shown in FIG. 16, the waste storage device, either mechanical or motorized, can be provided in many different sizes and shapes and the body 505 of the storage compartment can be adapted with, for example a drawer-like space 590 for easy access and emptying of the stored waste and such access can comprise a door 580 with a handle which glides outwardly from the device and can have a secure mechanism for engaging and disengaging with the body of the device.

Figure 17:
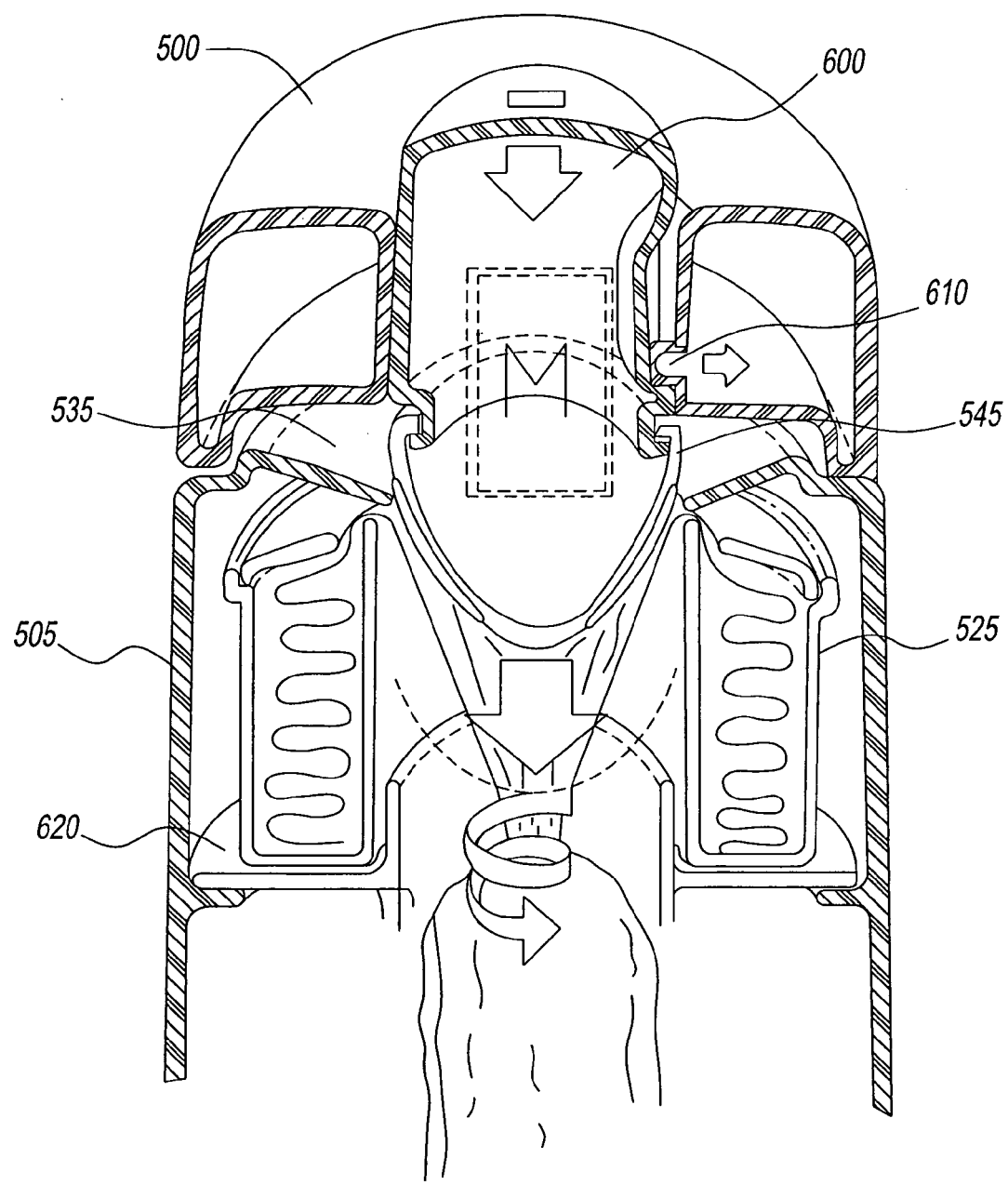
FIG. 17 is a sectional view along a longitudinal plane of the upper portion of a motorized device of the invention showing a retention mechanism and the cassette in place, wherein the motor is place in the rear of the device.

FIG. 17 shows another embodiment of the motorized waste storage device of the invention. In this aspect of the invention, the motor of the rotation mechanism is placed at the top rear end of the unit for the automatic opening and closure of the lid 500, of course, the motor may be located in other places on or in the container. FIG. 17 also shows an aspect of the invention wherein a plunger 545 comprising part of the lid 500 is pushed downwardly to activate power switch 610 and activate the system Additionally, plunger 545 pushes down the cassette on the retention ledge 535 to make the cassette stationary in the retention mechanism, while the rotation mechanism turns the flexible tubing containing the waste material. Additionally, FIG. 17 shows a rotatable turntable 620 which rests on a flange extending inwardly from the wall of the body 105. Turntable 620 has a center opening for allowing the passage of the tubing with or without waste material, and can also contain toothed structures (not shown) for frictionally engaging with cassette 525. In this aspect of the invention, the retention mechanism also forms part of the rotation mechanism and turntable 620 can rotate the cassette and seal the tubing.

Figure 18:
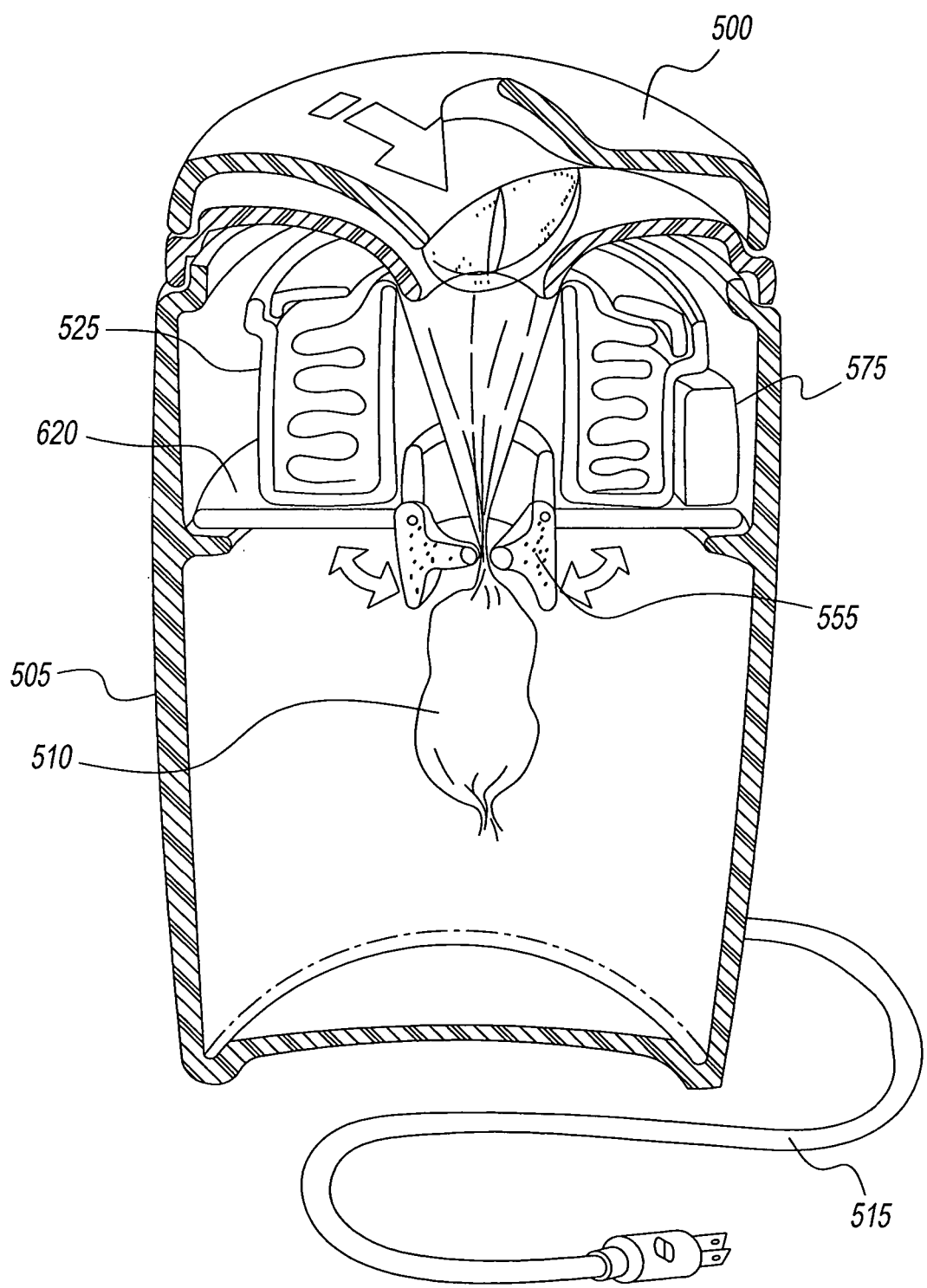
FIG. 18 is a sectional view along a longitudinal plane of a electronic device of the present invention comprising a motor, cassette, retention means and impulse heat sealer of the invention.

FIG. 18 shows a further aspect of the invention in which an electrical waste storage device is provided with an impulse heat-sealing means 555 adapted to the turntable 620. In this embodiment, the motor 575 is placed on the inner surface of the wall of the body of the device above the turntable 620.

Figures 19, 20:
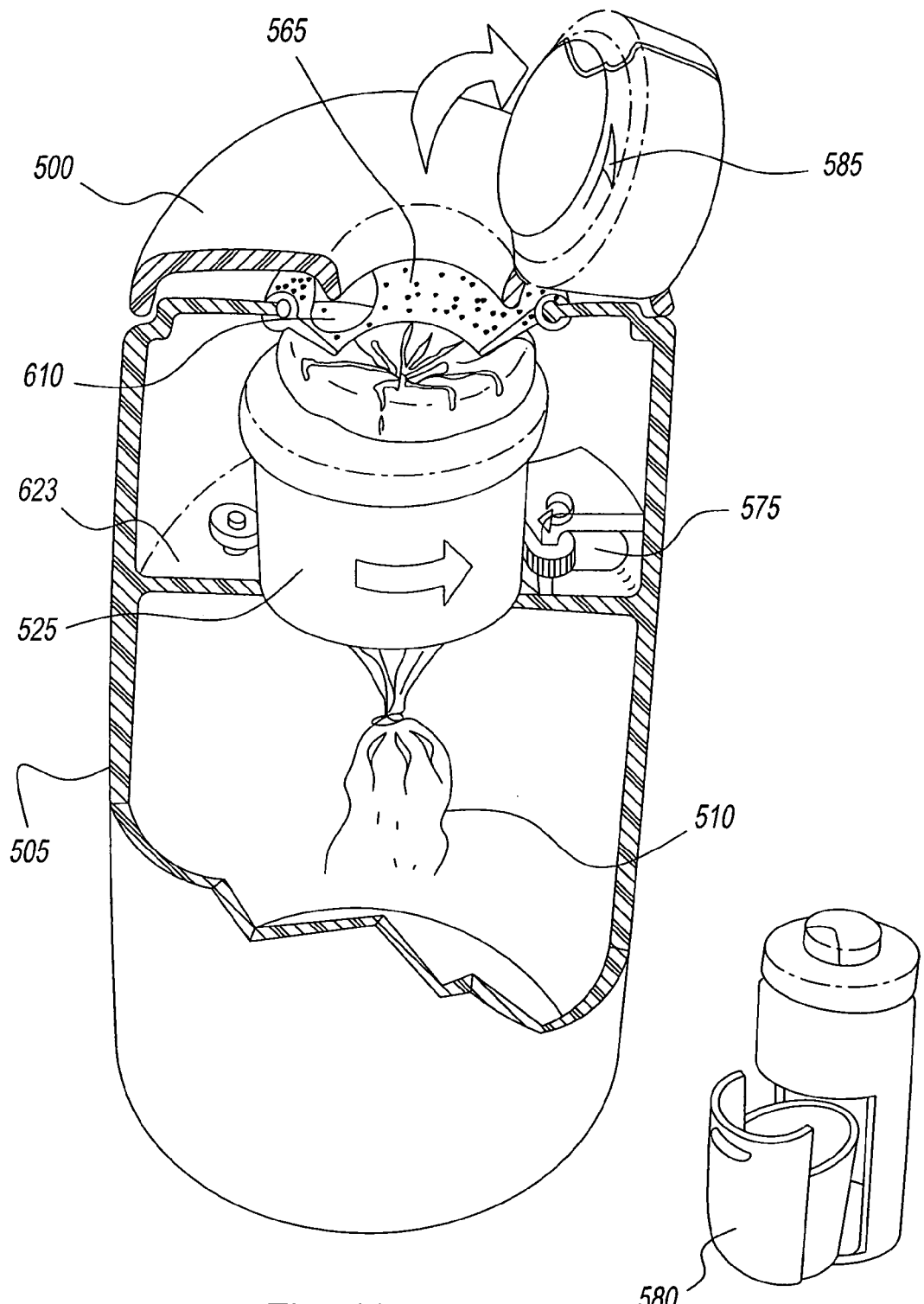
FIG. 19 is a schematic representation of the interior of a device of the invention showing a power switch, motor and electrical parts for rotating a cassette.
FIG. 20 shows the device of FIG. 19 provided with an access door for easy access to the waste storage compartment.

In FIG. 19, an alternate embodiment of the invention is illustrated in which the retention mechanism 623 is stationary and is adapted to hold the rotating mechanism comprising a motor 575 with electrical parts and gear as seen in FIG. 19 which form the mechanism for rotating the cassette 525. The motor 575 is activated by the manual action of closing lid 500 which actuates power switch 610 by the downward movement of the lid 500 on the button 610. FIG. 19 also shows that the central portion of lid 500 can be adapted with a cutting mechanism 585 for trimming the tubing prior to disposal of the waste packages. FIG. 20 shows the embodiment illustrated in FIG. 19 further adapted with a door 580 attached to the waste storage compartment designed for easy emptying of the stored waste.

Figure 21:
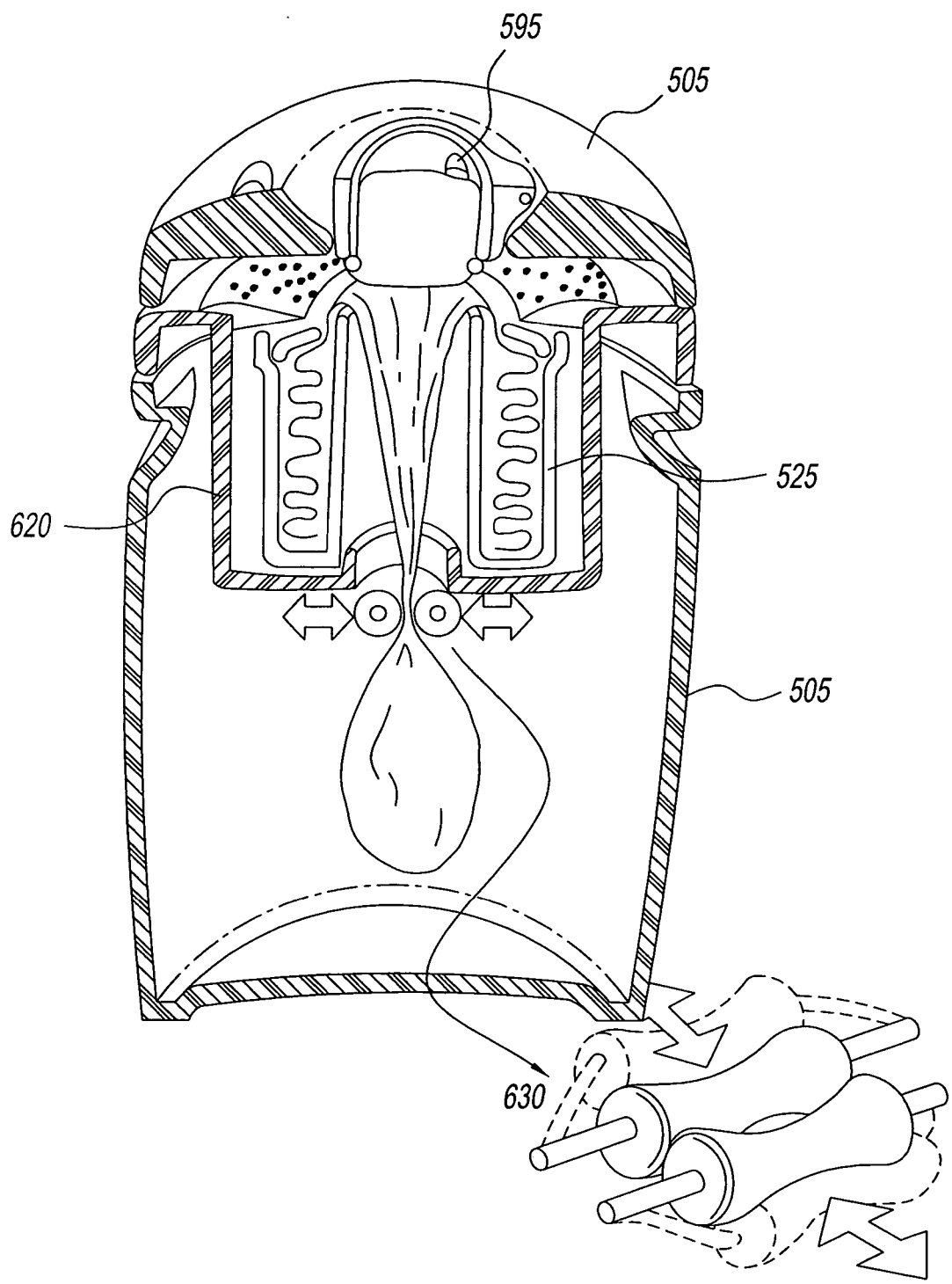
FIG. 21 shows a sectional view along a longitudinal plane of a device of the invention adapted with a roller mechanism.

A further embodiment of the invention is illustrated in FIG. 21 in which the waste storage device is provided with a roller means 630 for compacting the waste material and aid in pulling the tubing from the cassette. The roller means 630 can also form part of the retention mechanism and aid in stabilizing the encapsulated waste during rotation while sealing the package.

Figure 22:
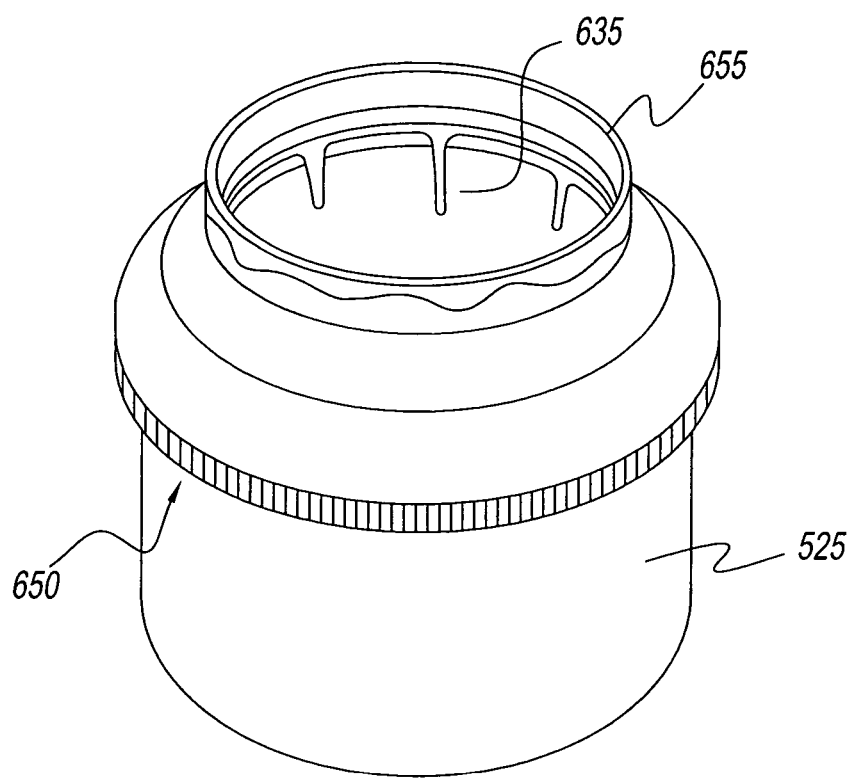
FIG. 22 depicts a general cassette having application to a mechanical, electrical, or electromechanical twisting mechanism of the present invention.

FIG. 22 shows an embodiment of the invention in which the cassette 525 comprising the tubing is provided with a gear 650 along the outer circumference of the cassette 525 for engaging and to be rotated with the rotation mechanism. In this aspect of the invention, the gear 650 is provided on middle of the exterior surface of the cassette 525, however, the gear 650 can be provided on other parts of the cassette, for example, on the upper or lower rim of the cassette 525. FIG. 22 also shows that the cassette 525 is provided with a frame defining waste passage 655, which is also shown with reference to FIG. 3, 140.

Figure 24:
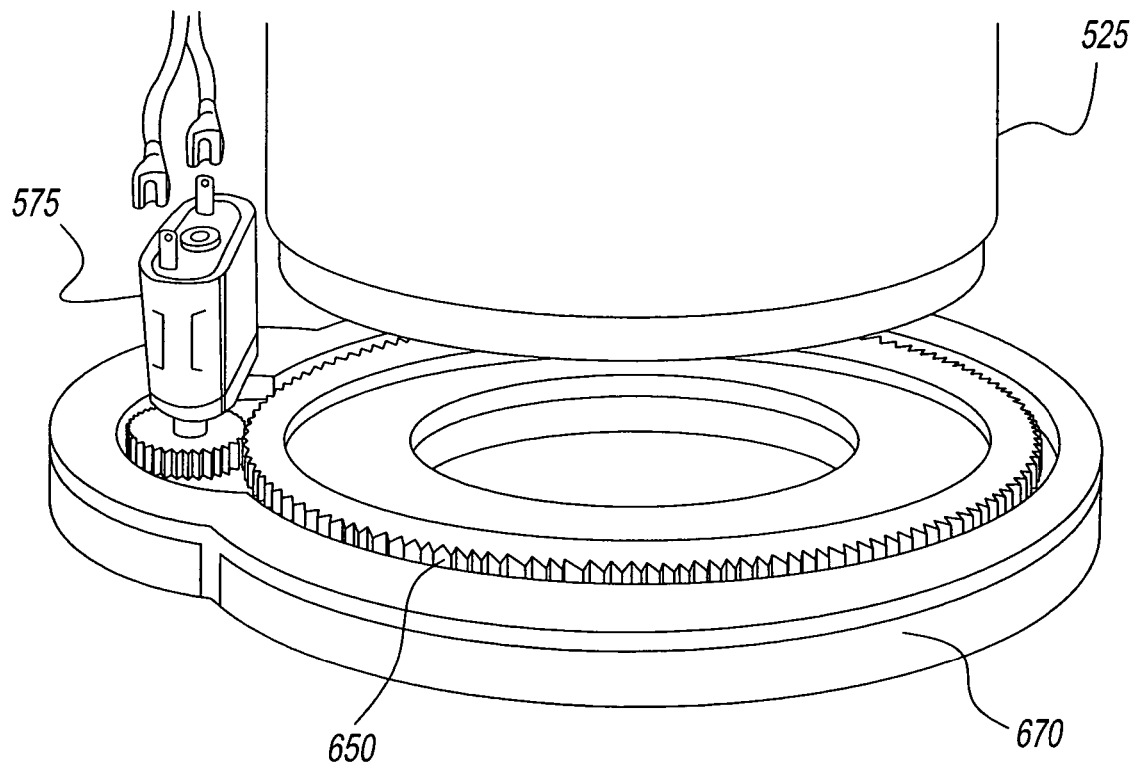
FIG. 24 shows an embodiment of the invention in which the rotation mechanism comprises a gear rack for engaging with the cassette during rotation is provided on the retention mechanism

In a further embodiment of the invention, the powered rotation mechanism 575, 650 for rotating the cassette 525 can be provided to the retention mechanism 670 as shown in FIG. 24. In this embodiment, at least one gear can be arranged in the waste container and the cassette 525 is provided with means for securely engaging with the retention mechanism. In this aspect of the invention, the retention mechanism 670 would remain stationary during rotation of the cassette 525.

Figure 23:
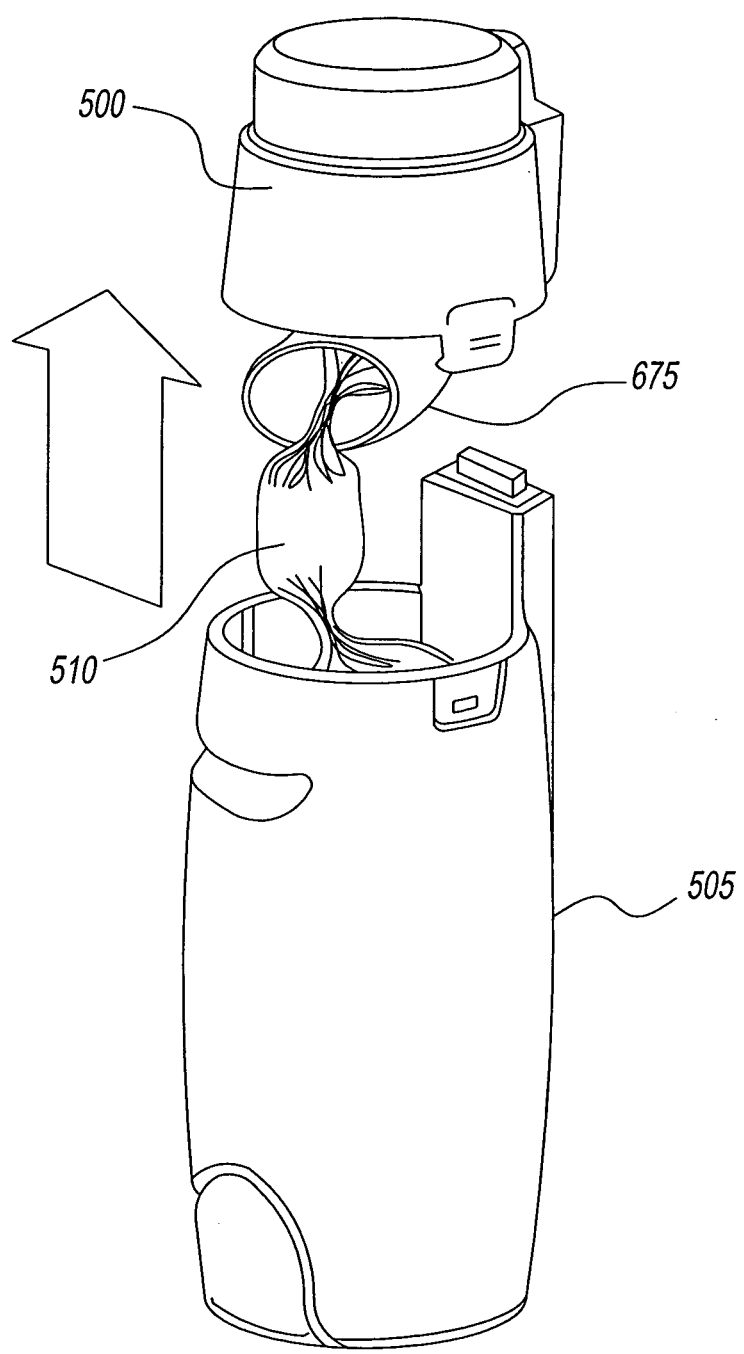
FIG. 23 depicts a device of the invention showing a waste package retention portion attached to the bottom portion of the cassette.

FIG. 23 illustrate an alternate retention mechanism of the invention. As seen in FIG. 23, retention mechanism 675 is provided to the lid 500 portion of the device below the cassette compartment, and is in the form of a tube which protrudes laterally from the center aperture of the cassette. The retention mechanism aids in preventing the previously encapsulated waste package 510 from untwisting during sealing of the next waste package.

Figure 25:
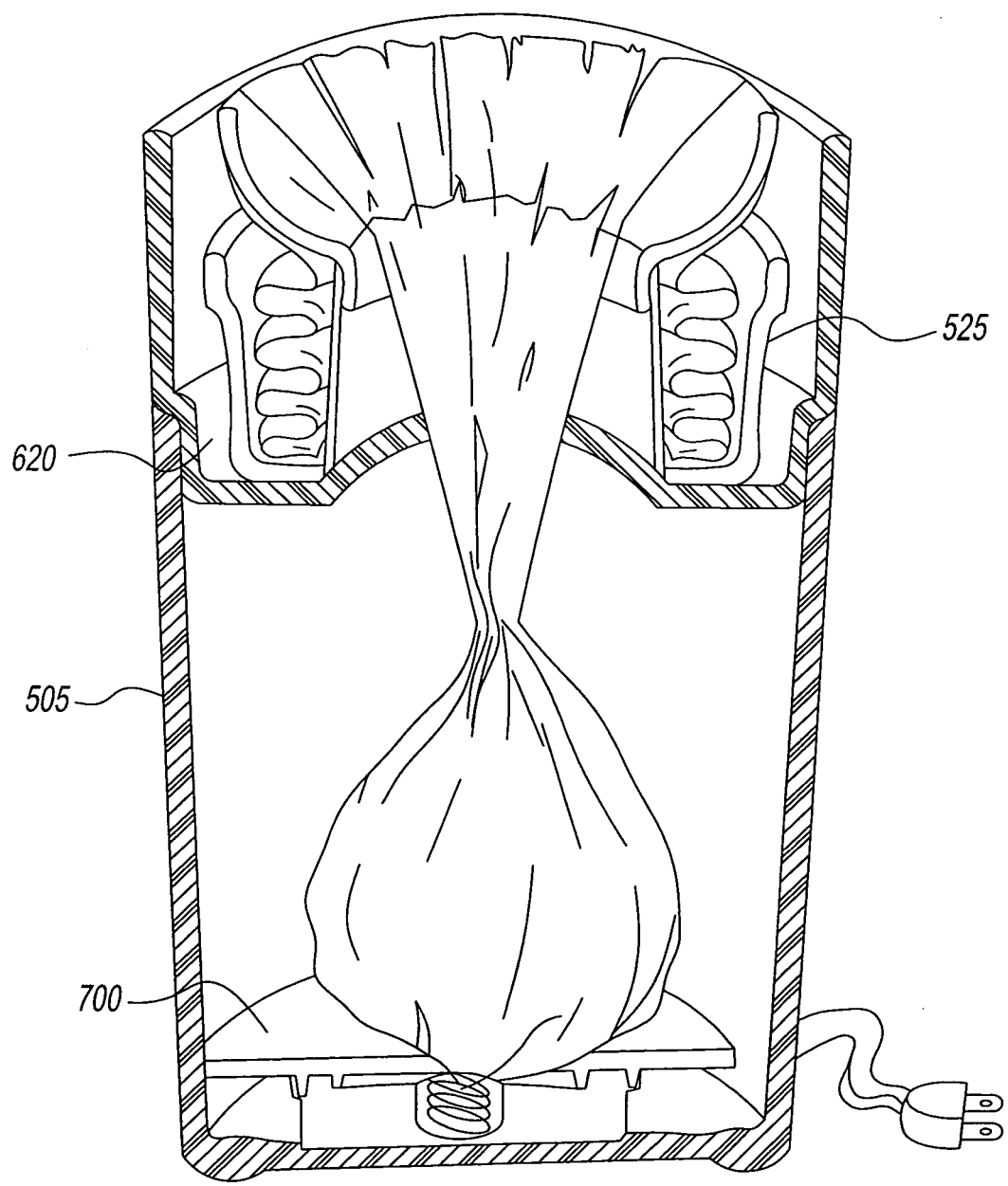
FIG. 25 shows an embodiment of the invention wherein the device is provided with an electrically operated turntable at the base of the container for twisting and sealing the waste package.
Figure 26:
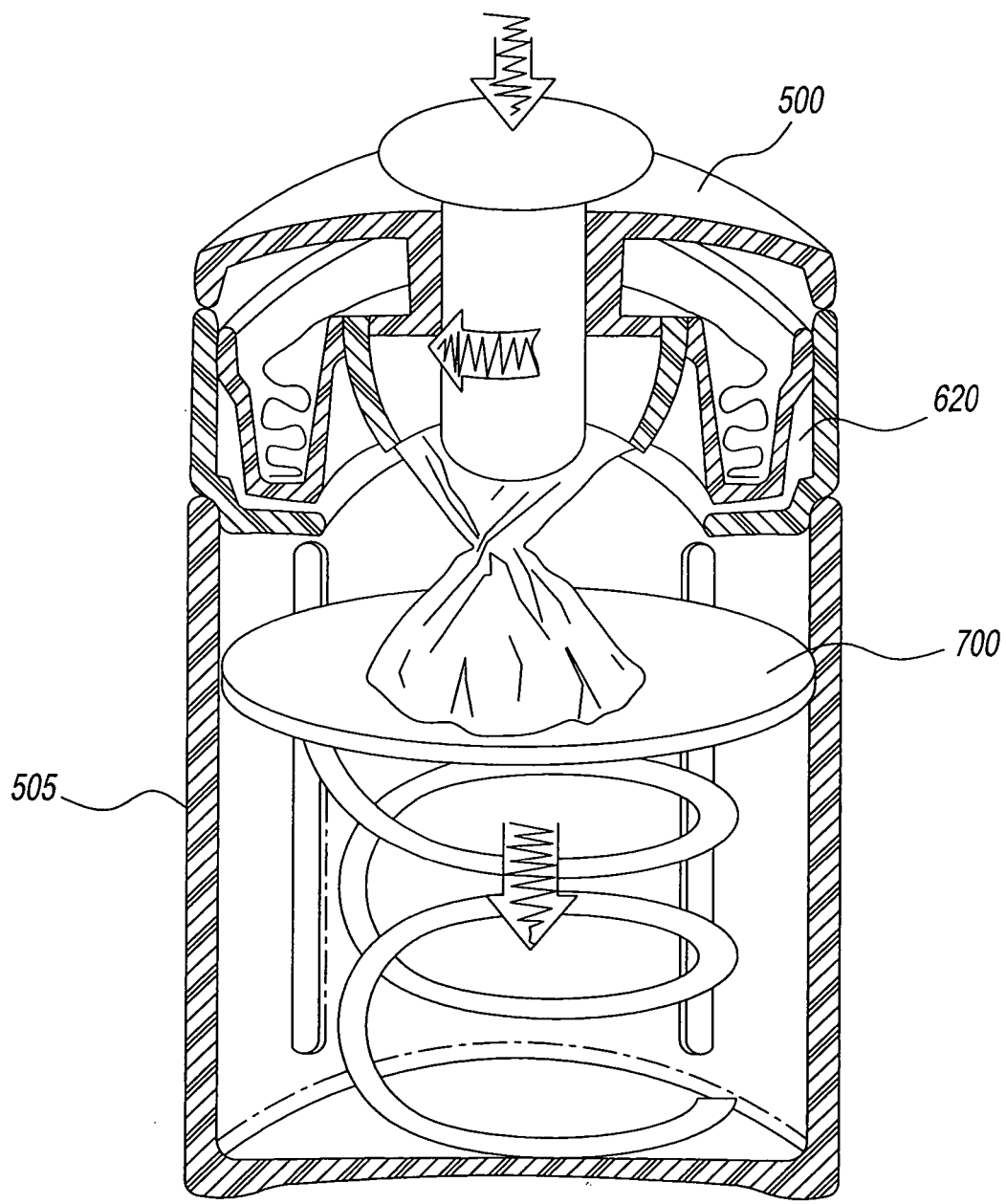
FIG. 26 shows an embodiment of the invention wherein the device is provided with a 1o mechanical turntable at the base of the container which can be operated manually.

In another embodiment shown with reference to FIG. 25, the waste storage device is provided with a rotating mechanism in the form of a turntable 700 at the base of the device. The turntable 700 is electrically driven to rotate and seal an encapsulated waste product resting on its surface. The turntable 700 can also serve as a retention mechanism during sealing of the waste product. FIG. 26 shows a similar embodiment comprising a turntable 700 as shown in FIG. 25, except that the sealing mechanism can be operated manually.

Although the present invention and its advantages have been described in detail, it should be understood that various changes, substitutions and alterations can be made therein without departing from the spirit and scope of the invention as defined by the appended claims. For example, components in one figure can be combined with components shown in another figure.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated in their entirety herein.

The invention claimed is:

1. A sealing mechanism for a waste storage container, the waste storage container having a body, a lid and a cartridge adapted to be positioned in the body, the cartridge having a continuous length of storage film therein, the storage film emanating through a gap of the cartridge and being folded down through a core opening in the core tube into an interior space of the body of the waste storage container, the sealing mechanism comprising:
  an actuator accessible from outside of the body;
  a gear assembly operably connected to said actuator;
  a motor engaged with said gear assembly for rotating the cartridge;

a refill twister having a gripping surface that contacts a top of the cartridge for rotation thereof;
a retaining assembly that holds stationary a dispensed portion of the storage film in the interior space of the body during a twist-closure operation;
a plunger operably connected to said gear assembly;
a mechanism that actuates said plunger upon completion of said twist-closure operation; and
a revolution counting mechanism for counting a predetermined number of revolutions executed by said gear assembly,
wherein actuation of said actuator causes said gear assembly to rotate said cartridge and twist the storage film during said twist-closure operation, and wherein said mechanism actuates said plunger to lower the storage film upon completion of said twist-closure operation.

2. The sealing mechanism of claim 1, wherein said retaining assembly is one or more retention springs connected to the body of the waste storage container, and wherein a distal end of said one or more retention springs is positioned under and aligned with the core opening in the core tube of the cartridge.

3. The sealing mechanism of claim 2, wherein said one or more retention springs is a plurality of retention springs equidistantly positioned along an inner circumference of the body of the waste storage container.

4. The sealing mechanism of claim 1, further comprising: a first linkage connected to said plunger; a second linkage connected to said first linkage; and a drive rod operably connected to said second linkage and said gear assembly, wherein movement of said drive rod causes said second linkage to move radially with respect to the body thereby causing said plunger to move longitudinally with respect to the body through the core opening of the cartridge and causing lowering of the storage film.

5. The sealing mechanism of claim 4, wherein said first linkage is a scissors linkage assembly.

6. The sealing mechanism of claim 2, wherein said second linkage is a slideable linkage.

7. The sealing mechanism of claim 6, wherein movement of said drive rod is rotational.

8. The sealing mechanism of claim 4, wherein said refill twister is a ring in contact with the cartridge, wherein said plunger passes through said ring when lowering the storage film.

9. The sealing mechanism of claim 8, wherein said refill twister is substantially concentrically aligned with the body of the waste storage container.

10. The sealing mechanism of claim 8, wherein said refill twister is substantially concentrically aligned with a holding ring that positions the cartridge.

11. The sealing mechanism of claim 8, wherein said refill twister is substantially concentrically aligned with and positioned above a holding ring that positions the cartridge.

12. The sealing mechanism of claim 1, wherein said refill twister is a ring, and wherein said plunger passes through said ring when lowering the storage film.

13. The sealing mechanism of claim 12, wherein said refill twister is substantially concentrically aligned with the body of the waste storage container.

14. The sealing mechanism of claim 13, wherein said refill twister is substantially concentrically aligned with a holding ring that positions the cartridge.

15. The sealing mechanism of claim 14, wherein said refill twister is positioned in an upper portion of the body of the waste storage container.

16. A waste disposal device comprising:
a container body having a bottom wall and a wall that is connected to and surrounds said bottom wall to provide an interior volume and an at least partially open top portion for insertion of waste, said wall having a flange support extending therefrom into said interior volume, said flange support having a flange support opening through at least a portion of said flange support, said container body having a bin space between said flange support and said bottom wall, said wall connected to a lid portion covering said at least partially open top portion for insertion of waste;
a cassette positioned on said flange support, said cassette having a cassette body comprising a cylindrical wall, a bottom rim, an inner core tube and a rim which together define a cavity containing a flexible tubing material stored in a continuously folded manner, said inner core tube surrounding a cassette core opening that at least partially overlaps with said flange support opening, said flexible tubing material being dispensable from said cassette through said cassette core opening and said flange support opening into said bin space, said cassette being rotatable on said flange support to twist said flexible tubing material;
an automatic control that twists and lowers said flexible tubing material below said cassette in said lid portion, said automatic control having an electronic motor-driver control gear assembly, an actuator, and a refill twister, said refill twister comprising a tubular ring structure having a side wall that is complementary in shape to said cylindrical wall of said cassette surrounding an open portion, said side wall having a surface that contacts said rim of said cassette to propel, by an action of said motor-driven gear assembly, said cassette into rotational motion;
a revolution counting mechanism for counting a predetermined number of revolutions executed by said rotational motion of said cassette; and
a thrust plate to effect a downward thrusting motion through said open portion and said cassette core opening at a twist-tightened upper end of said flexible tubing material enclosing a waste pack pulling additional tubing from said cassette to provide a pouch-like space below said cassette core opening in order to receive a next waste pack to seal said waste in said pouch-like space.

17. The sealing mechanism of claim 1, wherein said revolution counting mechanism is a sensing device that detects a plurality of motion detecting mechanisms on said cassette.

18. The sealing mechanism of claim 1, wherein said revolution counting mechanism is a laser beam that detects a plurality of apertures on said cassette.

19. A waste storage device having a sealing mechanism, comprising:
a container body having a bottom wall and a wall that is connected to and surrounds said bottom wall to provide an interior volume and an at least partially open top portion for insertion of waste;
a flexible tubing material in said container body, said flexible tubing material being rotatable to twist said flexible tubing material; and
a rubber diaphragm rotation mechanism having an opening so that said flexible tubing material passes through said opening in said rubber diaphragm rotation mechanism.

20. The waste storage device of claim 19, wherein the rubber diaphragm rotating mechanism includes a rubber diaphragm, the rubber diaphragm having the opening through which the flexible tubing material is passed.

21. The waste storage device of claim 20, wherein the diaphragm rotating mechanism creates a twist in the flexible tubing material after a waste packet has been inserted into an opened end of the flexible tubing material and passed through the opening in the rubber diaphragm.

22. The waste storage device of claim 21, wherein the opening includes at least one slit extending transversely across the rubber diaphragm and the twist is located below the opened end of the flexible tubing material.

23. A waste storage device for receiving one or more individual waste packets, comprising:
a container having a bottom wall and a side wall that is connected to the bottom wall, the bottom wall and the side wall at least partially defining an inner volume;
a lid that is pivotably connected to the container by a hinge, the lid being movable between an open position and a closed position, the open position permitting the insertion of the waste packets into the container;
flexible tubing material located within the container and having an opened end for receiving at least one waste packet when the lid is in the open position, the flexible tubing material being rotatable to twist the flexible tubing material; and
a diaphragm rotation mechanism positioned below the opened end of the flexible tubing material, the diaphragm rotation mechanism including a diaphragm having an opening through which the flexible tubing material passes, the diaphragm rotating mechanism creating a twist in the flexible tubing material after the at least one waste packet has been inserted into the opened end of the flexible tubing material and passed through the opening in the diaphragm, the twist acting to limit odors emanating from within the container.

24. The waste storage device of claim 23, wherein the flexible tubing material has a first portion that extends between the twist and the opened end of the flexible tubing material and a second portion that extends below the twist within the inner volume of the container.

25. The waste storage device of claim 24, wherein the diaphragm is a flexible material.

26. The waste storage device of claim 25, wherein the flexible material is rubber.

27. The waste storage device of claim 25, wherein the opening in the diaphragm includes at least one slit extending transversely across the diaphragm, and wherein the flexible material of the diaphragm deforms to permit insertion of the at least one waste packet through the at least one slit.

28. The waste storage device of claim 27, further including a projecting mechanism for engaging the second portion of the flexible tubing material.

29. The waste storage device of claim 28, wherein the projecting mechanism is an anti-untwisting mechanism.

30. The waste storage device of claim 27, wherein the slit causes a restricted region of the flexible tubing material below the opened end of the flexible tubing material.

31. The waste storage device of claim 23, wherein the diaphragm rotation mechanism includes a motor.

32. The waste storage device of claim 23, wherein the diaphragm rotation mechanism creates a series of twists in the flexible tubing material in the inner volume of the container.

33. The waste storage device of claim 32, further including a cartridge for dispensing the flexible tubing material.

34. The waste storage device of claim 33, wherein the side wall is a circular in cross section and supports the cartridge.

35. The waste storage device of claim 23, wherein the at least one waste packet is a soiled diaper.

36. The waste storage device of claim 23, wherein the side wall includes an opening that permits determination when the container is full.

37. The waste storage device of claim 23, further comprising an access door formed and pivotally connected to the side wall.

38. The waste storage device of claim 23, wherein the diaphragm rotation mechanism creates the twist in the flexible tubing material after movement of the lid from the open position to the closed position.

39. The waste storage device of claim 23, wherein the lid includes a latch that secures the lid to the container when the lid is moved into the closed position.

40. A waste storage device for receiving individual waste packets, comprising:
a container having a bottom wall and a side wall that is connected to the bottom wall, the bottom wall and the side wall at least partially defining an inner volume,
a lid that is pivotably connected to the container by a hinge, the lid being movable between an open position and a closed position, the open position permitting the insertion of at least one waste packet into the container;
flexible tubing material located in the container and having an opened end for receiving the at least one waste packet when the lid is in the open position, the flexible tubing material being twistable;
a diaphragm rotation mechanism positioned below the opened end of the flexible tubing material, the diaphragm rotation mechanism including a flexible diaphragm having at least one slit extending transversely across the diaphragm through which the flexible tubing material passes, the diaphragm rotating mechanism creating a twist in the flexible tubing material after the at least one waste packet has passed through the at least one slit in the flexible diaphragm and the lid has been moved to the closed position, the twist acting to limit odors emanating from within the container; and
an access door pivotally connected to the side wall to provide access to the inner volume.

41. The waste storage device of claim 40, wherein the access door pivotally connected to the side wall to provide access to the inner volume permits the flexible tubing material containing the individual waste packets to be removed from the container.

42. The waste storage device of claim 40, wherein the flexible tubing material has a first portion that extends between the twist and the opened end of the flexible material and a second portion that extends below the twist in the inner volume of the container.

43. The waste storage device of claim 42, further including a projecting mechanism for engaging the second portion of the flexible tubing material.

44. The waste storage device of claim 40, wherein the flexible material is rubber.

45. The waste storage device of claim 40, wherein the diaphragm rotation mechanism creates a series of twists in the flexible tubing material.

* * * * *